(12) United States Patent
Bender

(10) Patent No.: US 9,071,579 B1
(45) Date of Patent: Jun. 30, 2015

(54) SYSTEM FOR SENDER/RECEIVER TO SEND OR RECEIVE MOOD RELATED, TIME SENSITIVE OR SECRETIVE CONTENT/MESSAGES

(71) Applicant: T. Gregory Bender, Harrison, NY (US)

(72) Inventor: T. Gregory Bender, Harrison, NY (US)

(*) Notice: Subject to any disclaimer, the term of this patent is extended or adjusted under 35 U.S.C. 154(b) by 84 days.

(21) Appl. No.: 13/902,801

(22) Filed: May 25, 2013

Related U.S. Application Data

(60) Provisional application No. 61/652,099, filed on May 25, 2012, provisional application No. 61/662,305, filed on Jun. 20, 2012.

(51) Int. Cl.
*H04L 29/06* (2006.01)
*H04L 12/58* (2006.01)

(52) U.S. Cl.
CPC ......... *H04L 63/0428* (2013.01); *H04L 2209/42* (2013.01); *H04L 63/10* (2013.01); *H04L 51/32* (2013.01)

(58) Field of Classification Search
CPC ... H04L 67/306; H04L 51/32; H04L 2209/42; H04L 63/10

USPC ............................................................ 726/4
See application file for complete search history.

(56) References Cited

U.S. PATENT DOCUMENTS

| | | | |
|---|---|---|---|
| 8,693,653 B1* | 4/2014 | Mullen | 379/201.01 |
| 2002/0099824 A1* | 7/2002 | Bender et al. | 709/225 |
| 2006/0256959 A1* | 11/2006 | Hymes | 379/433.04 |
| 2007/0030824 A1* | 2/2007 | Ribaudo et al. | 370/328 |
| 2007/0220614 A1* | 9/2007 | Ellis et al. | 726/27 |
| 2008/0046511 A1* | 2/2008 | Skrenta | 709/204 |
| 2008/0077482 A1* | 3/2008 | Tota et al. | 705/10 |
| 2010/0191975 A1* | 7/2010 | Chase et al. | 713/176 |
| 2012/0201362 A1* | 8/2012 | Crossan et al. | 379/88.01 |
| 2013/0218983 A1* | 8/2013 | Richard | 709/206 |

* cited by examiner

*Primary Examiner* — Harunur Rashid
*Assistant Examiner* — Bryan Wright
(74) *Attorney, Agent, or Firm* — Richard Mark Blank, Esq.

(57) ABSTRACT

A system and method for submission and receipt of communications and information including sending, receiving, and responding to mood related, time-sensitive and/or secretive messages or information, through a one-step submission to communication networks and/or social media platforms, through a anonymous submit and targeted authorized receipt process, having the generating, assigning, and utilizing of unique identifiers, and corresponding actionable and searchable administrative report generating process.

17 Claims, 39 Drawing Sheets

SYSTEM FLOW

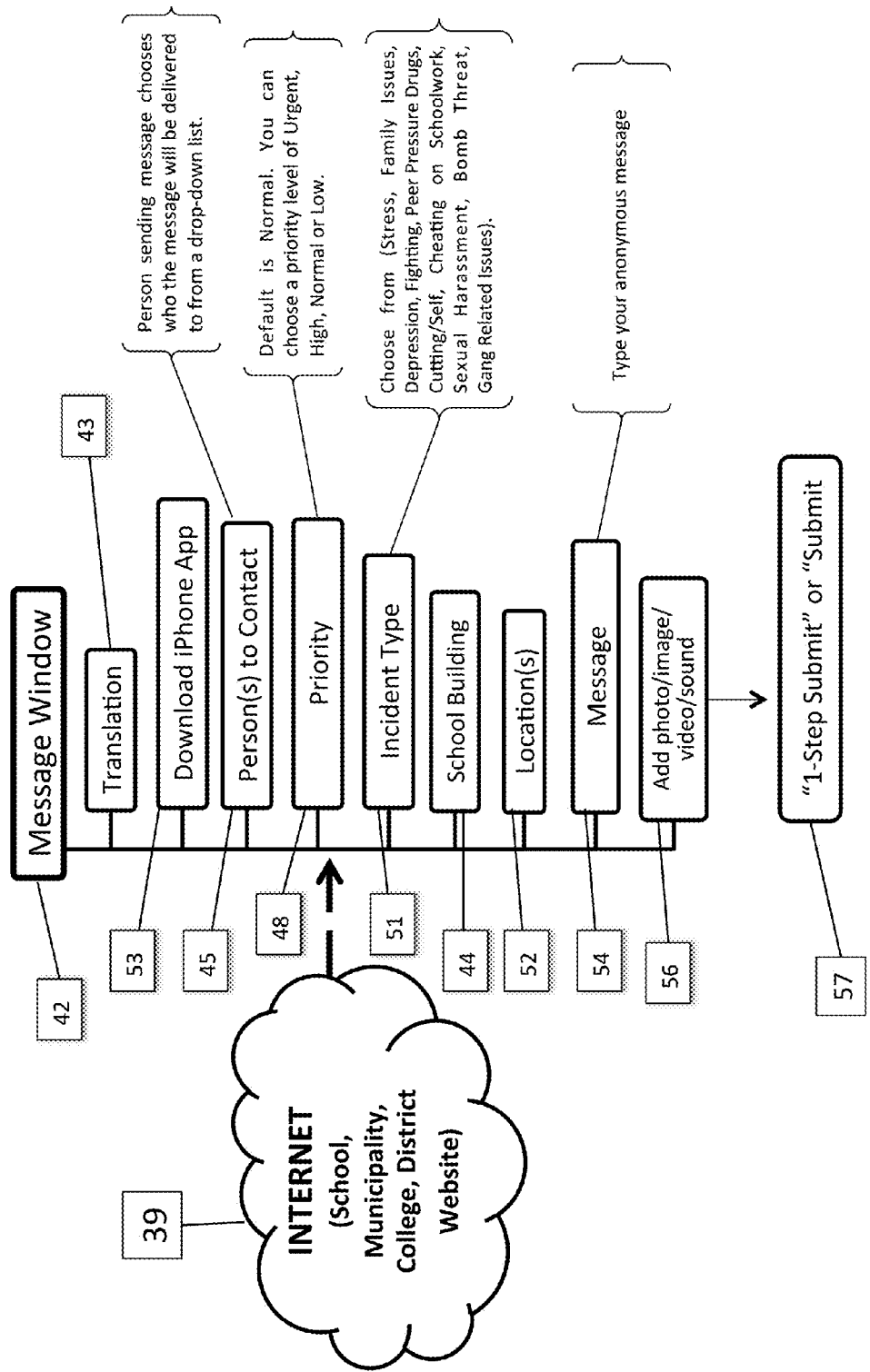

FIG. 2A Choose an Image
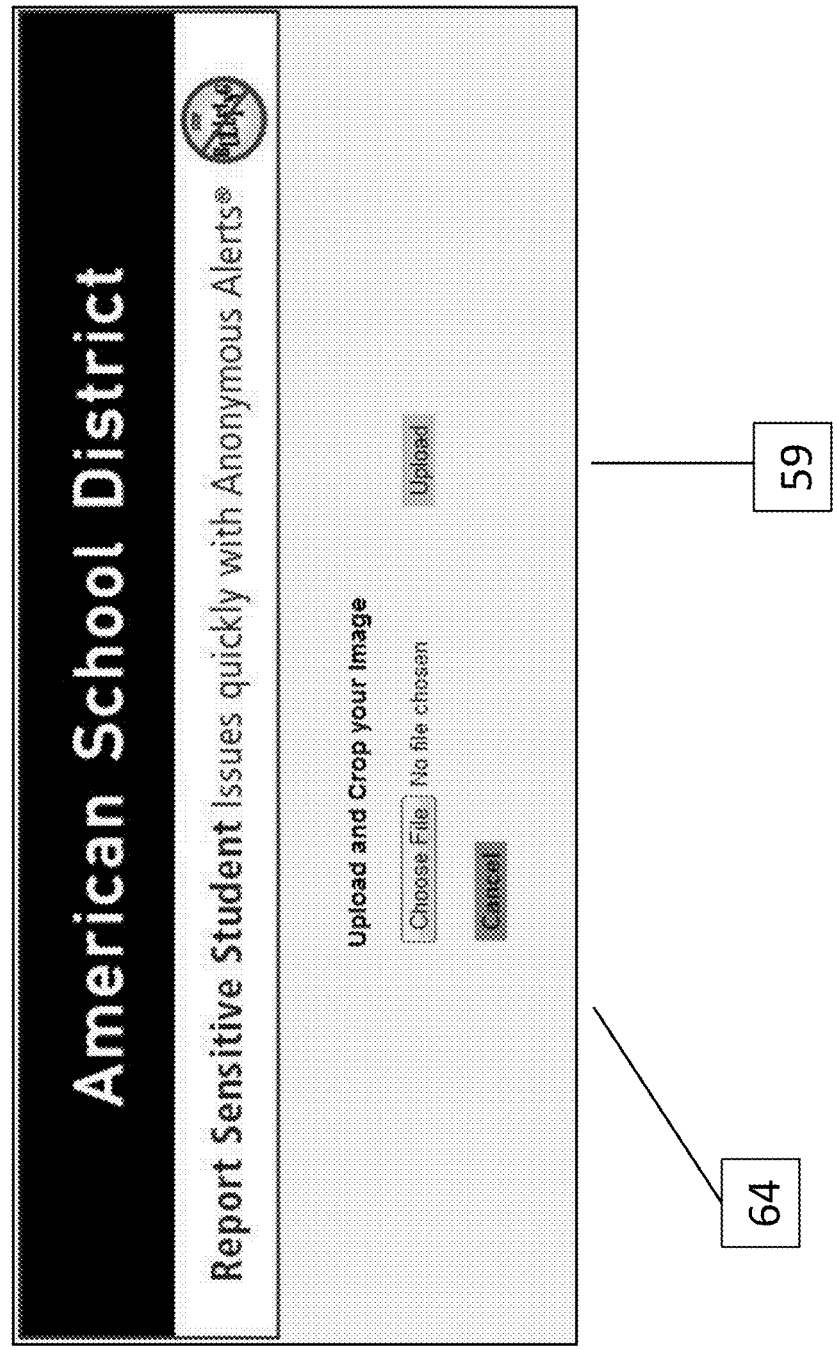

FIG. 2B Selecting the image

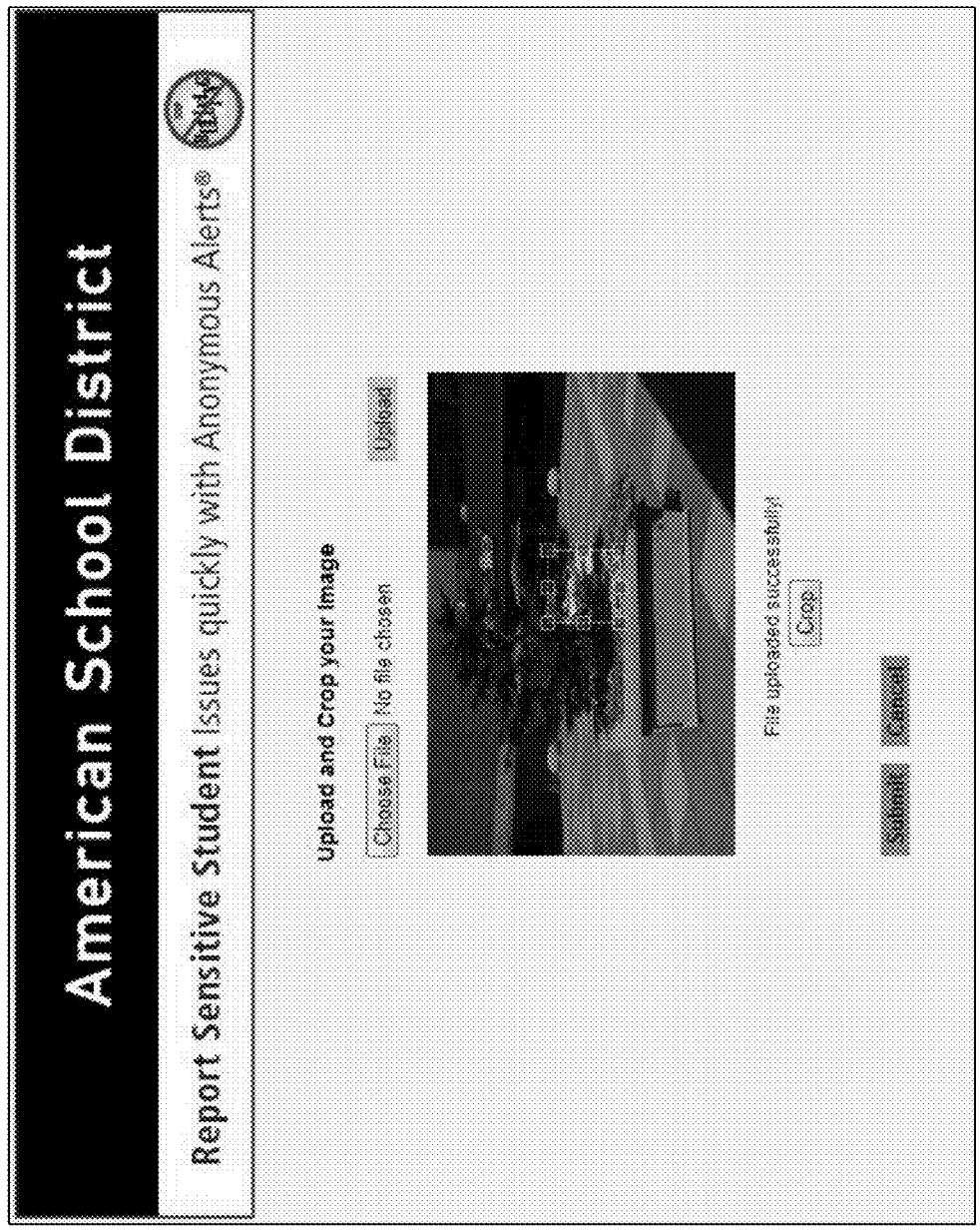
FIG. 2C: Uploading the image

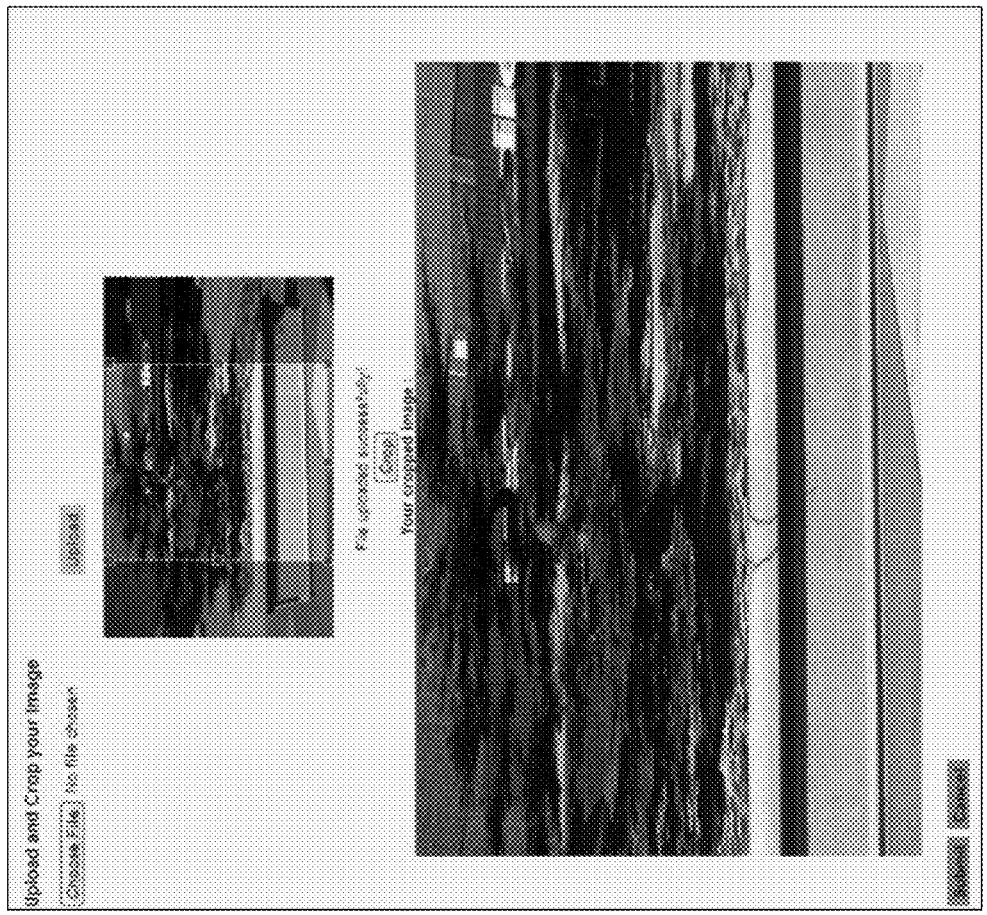
FIG. 2D Crop the image

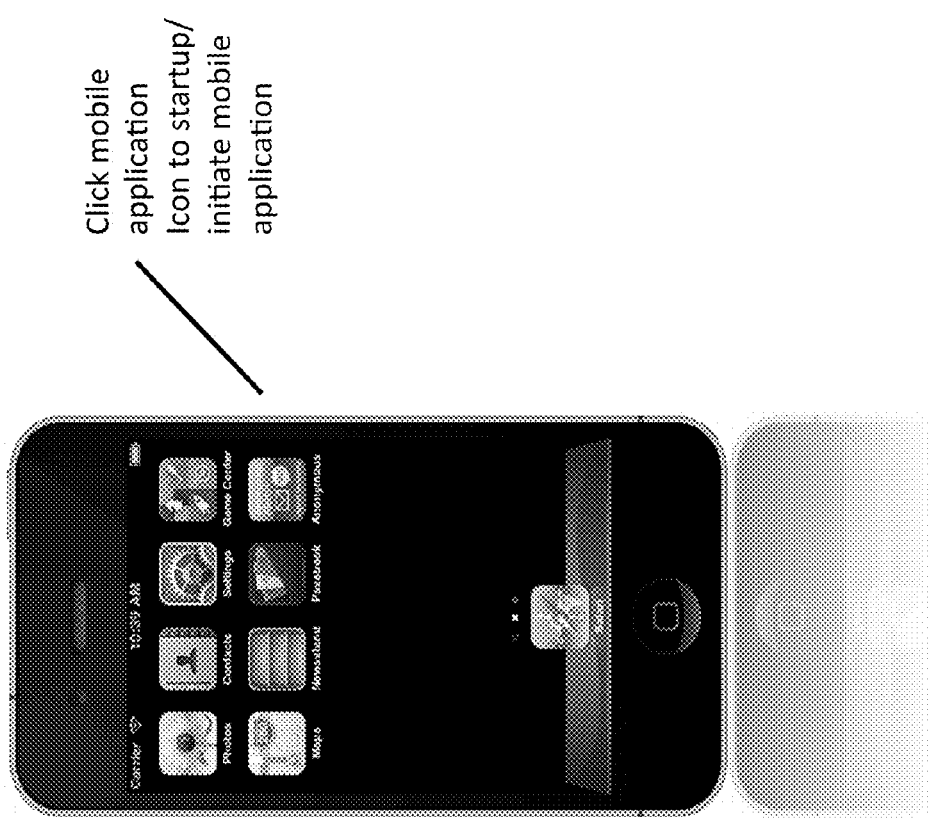
FIG. 2E Mobile Application Screen
Mobile Screen 1.

FIG. 2F Mobile Application Screen
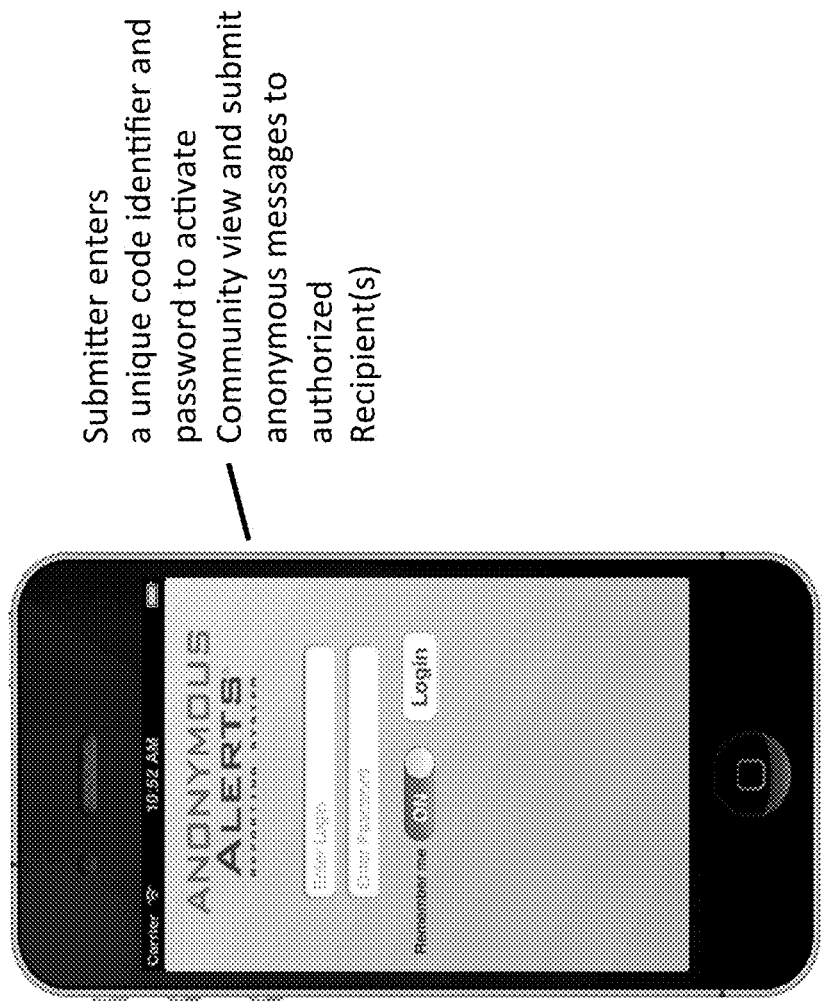
Submitter enters a unique code identifier and password to activate Community view and submit anonymous messages to authorized Recipient(s)
Mobile Screen 2.

FIG. 2G Mobile Application Screen
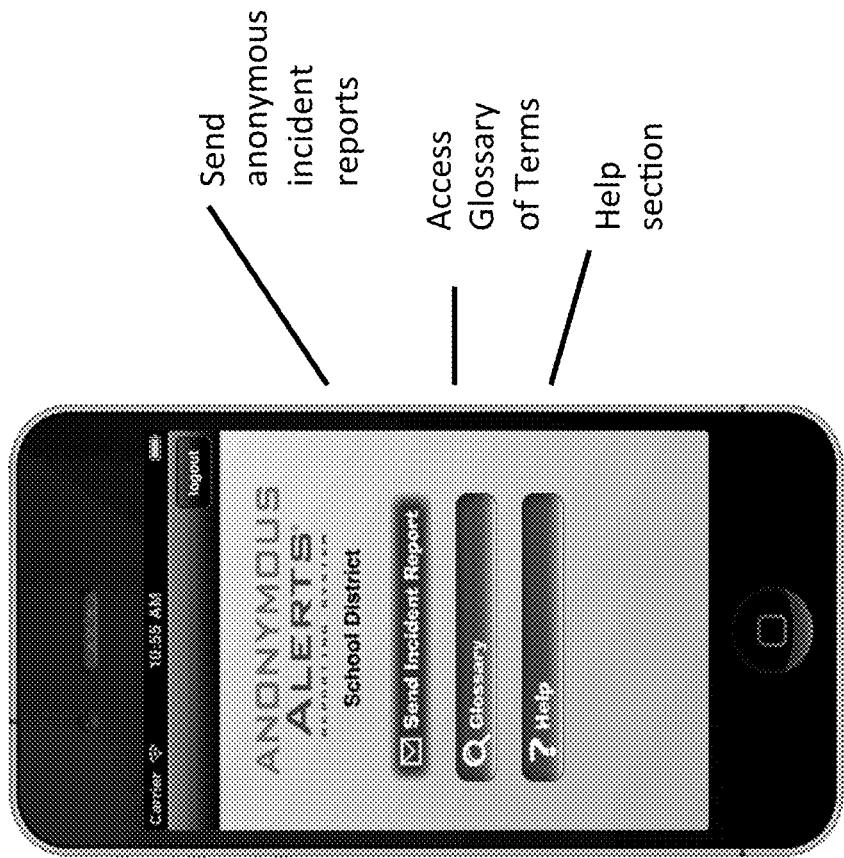
Mobile Screen 3.

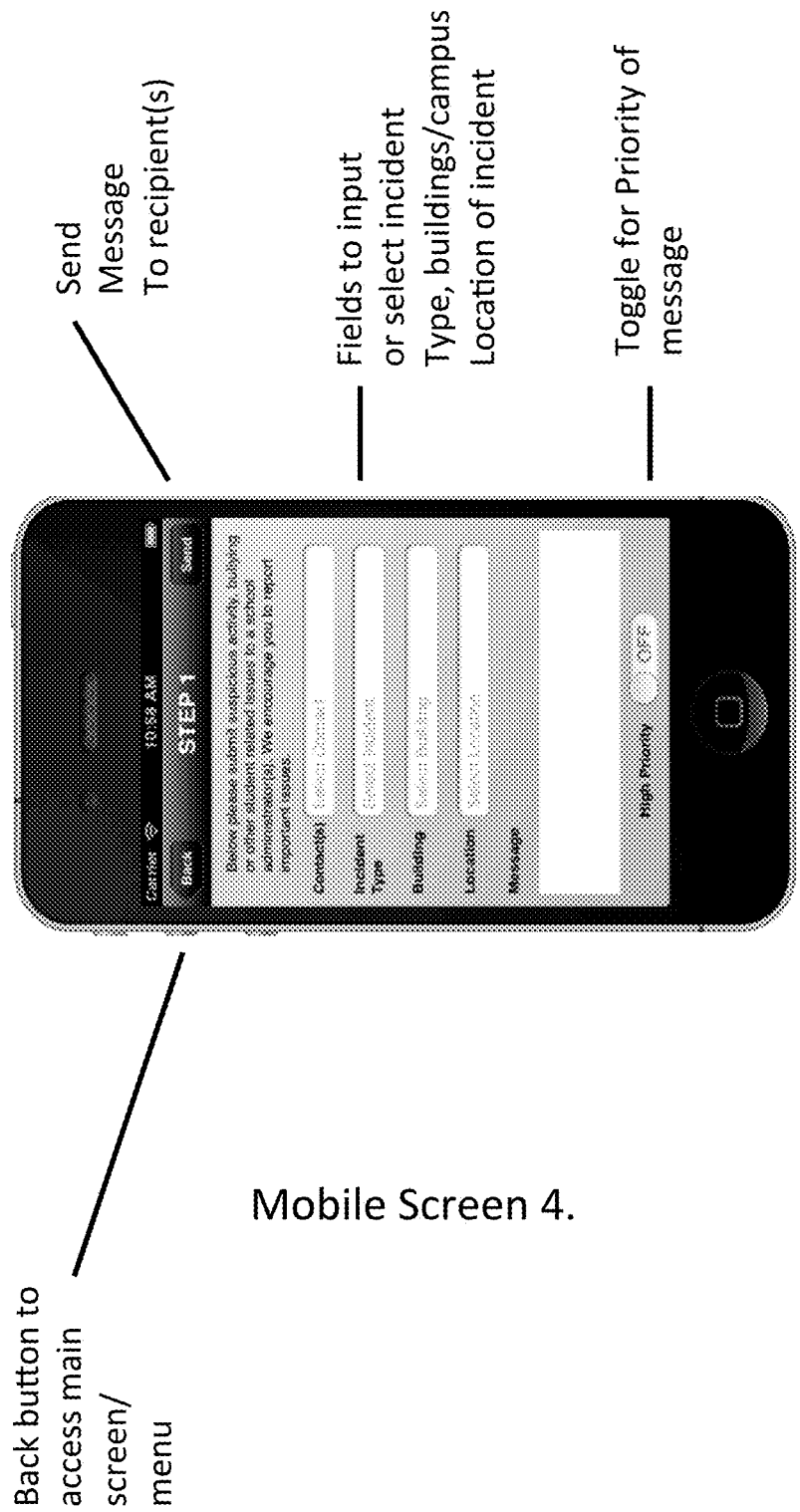
FIG. 2H Mobile Application Screen
Mobile Screen 4.

FIG. 2I Mobile Application Screen
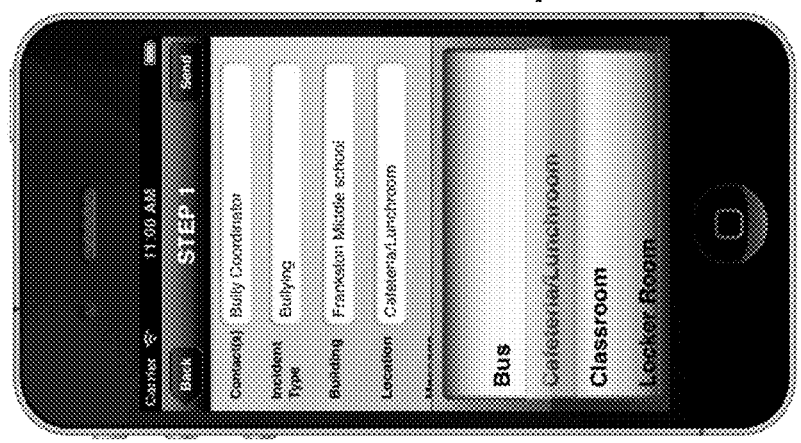
Submitter can select location with a picker that is data driven with custom locations
Mobile Screen 5.

FIG.2J Mobile Application Screen
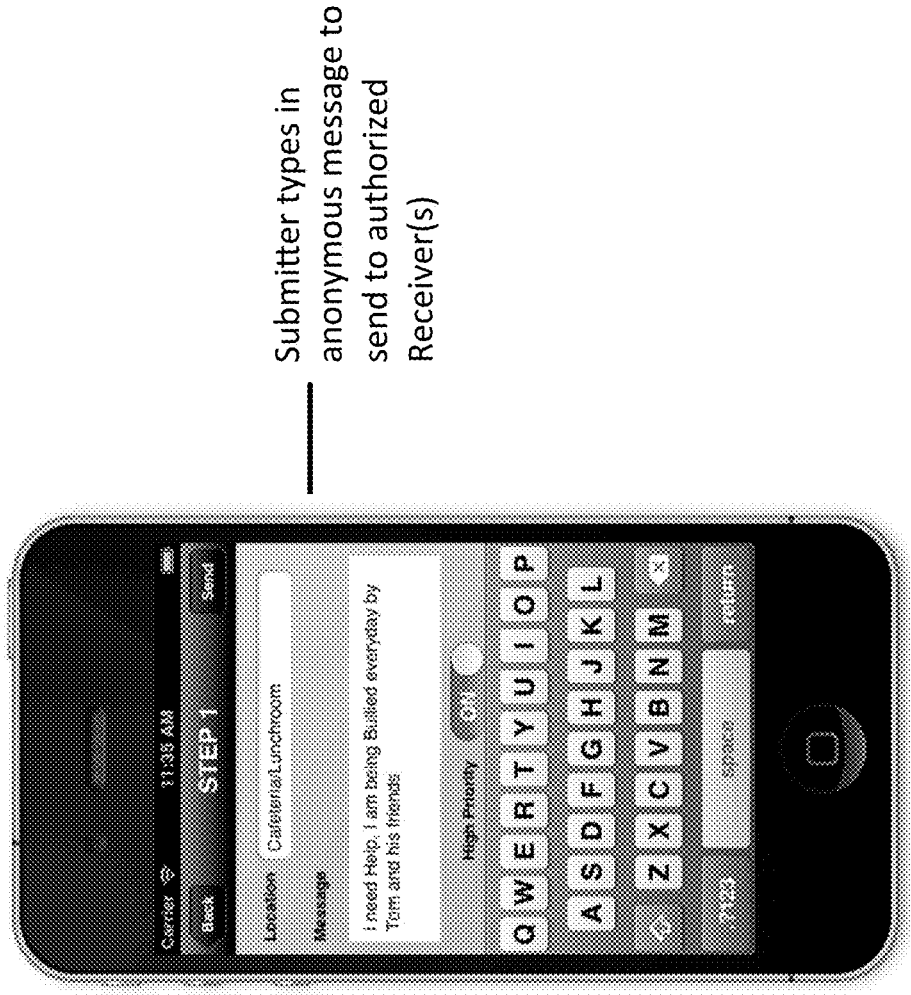
Submitter types in anonymous message to send to authorized Receiver(s)
Mobile Screen 6.

FIG.2K Mobile Application Screen
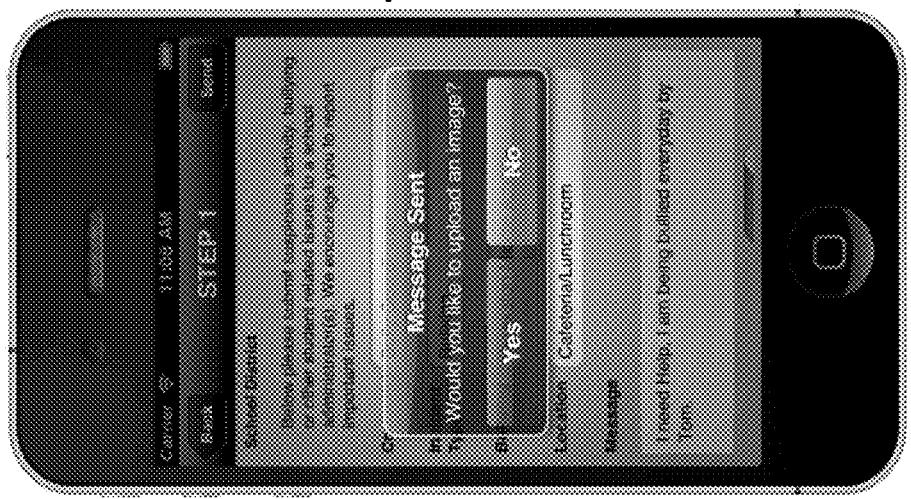
Submitter is prompted to upload an image At their discretion If they have an image to upload about an incident report
Mobile Screen 7.

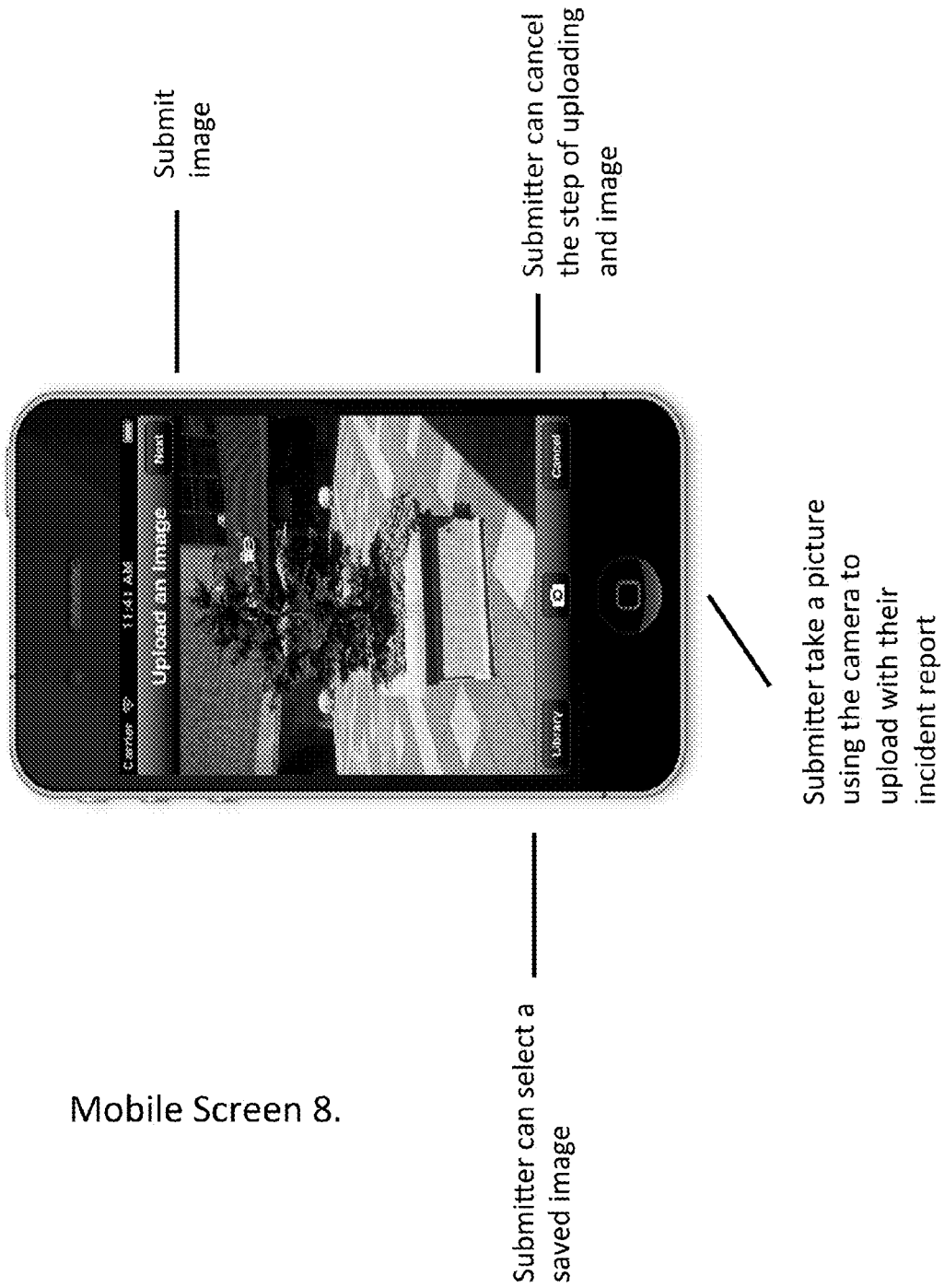
FIG. 2L Mobile Application Screen
Mobile Screen 8.

FIG.2M Mobile Application Screen
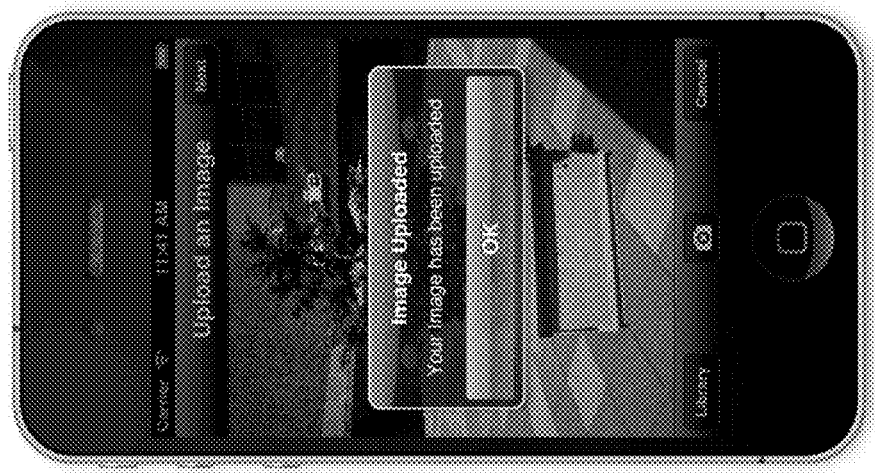
Confirmation screen
Details that the image is successfully uploaded with text report of the incident by the submitter
Mobile Screen 9.

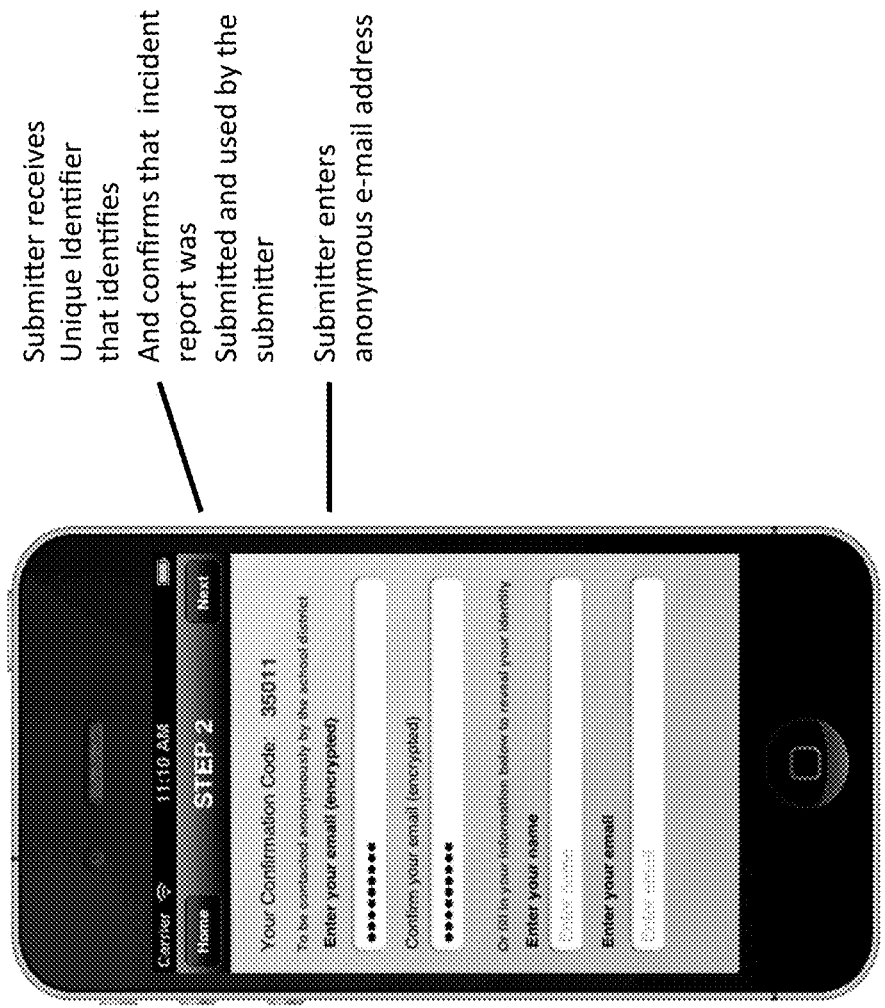
FIG.2N Mobile Application Screen
Mobile Screen 10.

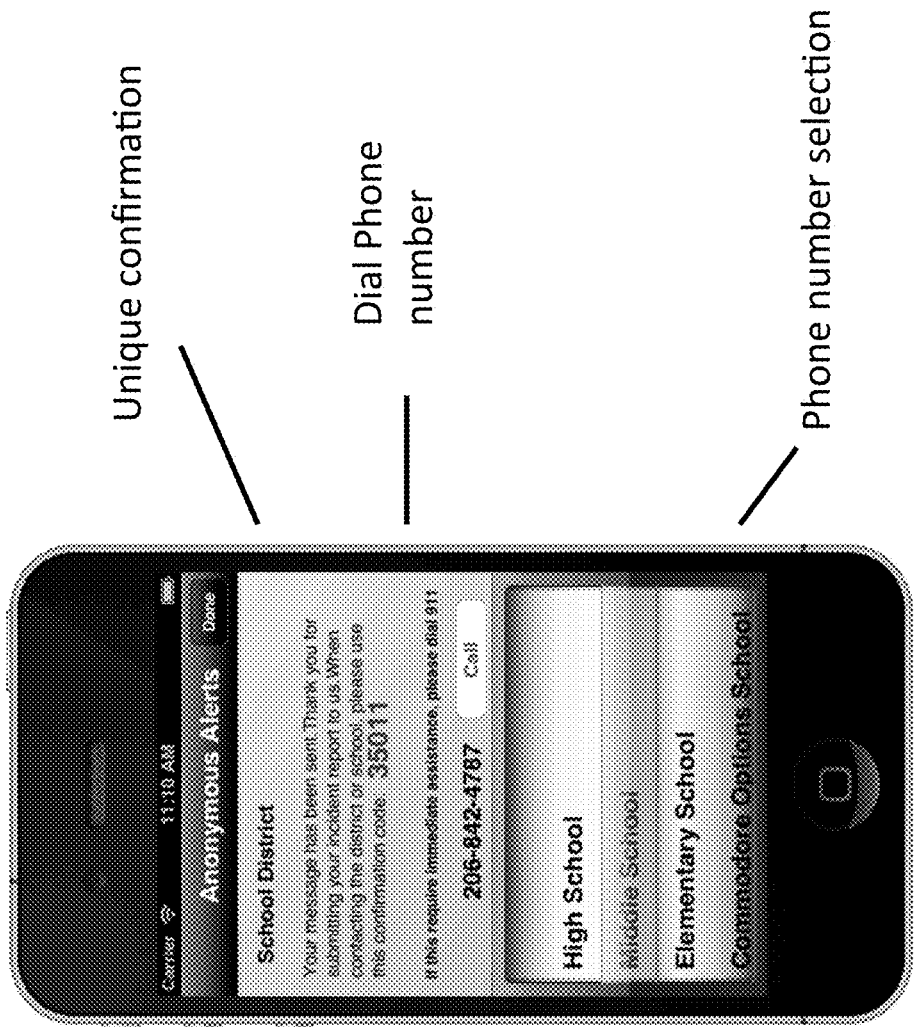
FIG.20 Mobile Application Screen
Mobile Screen 11.

FIG.2P Mobile Application Screen
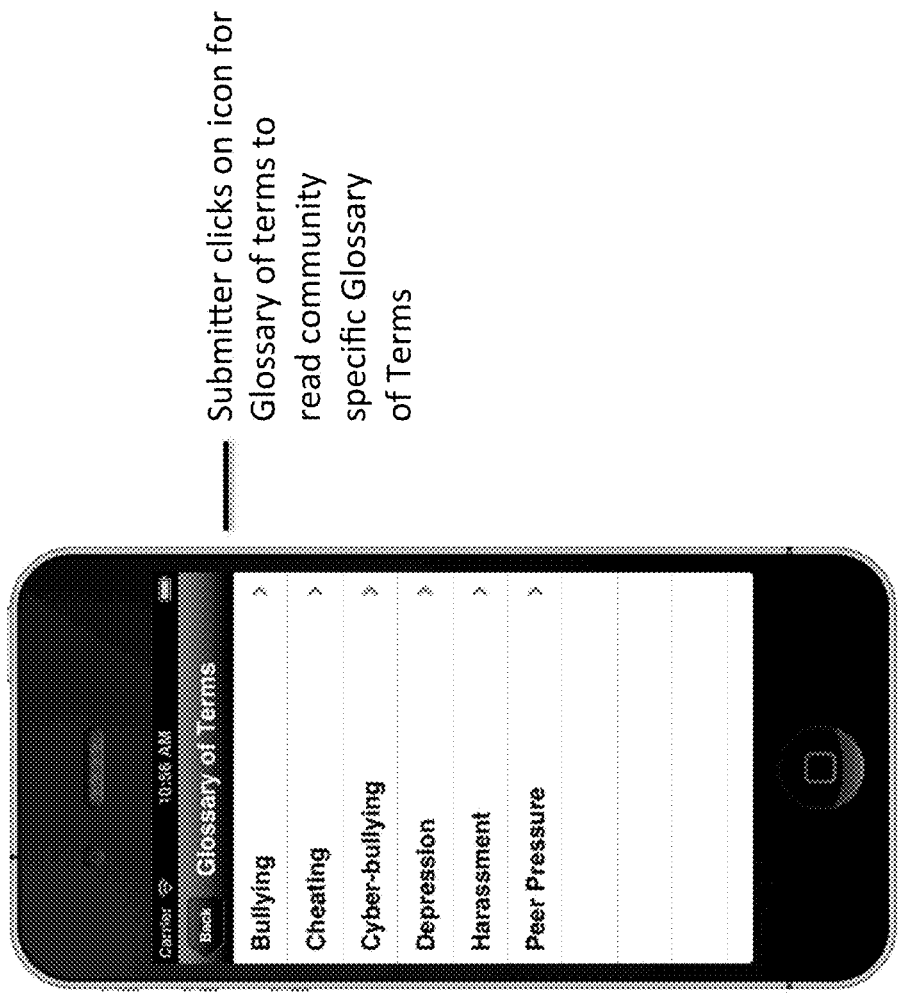
Submitter clicks on icon for Glossary of terms to read community specific Glossary of Terms
Mobile Screen 12.

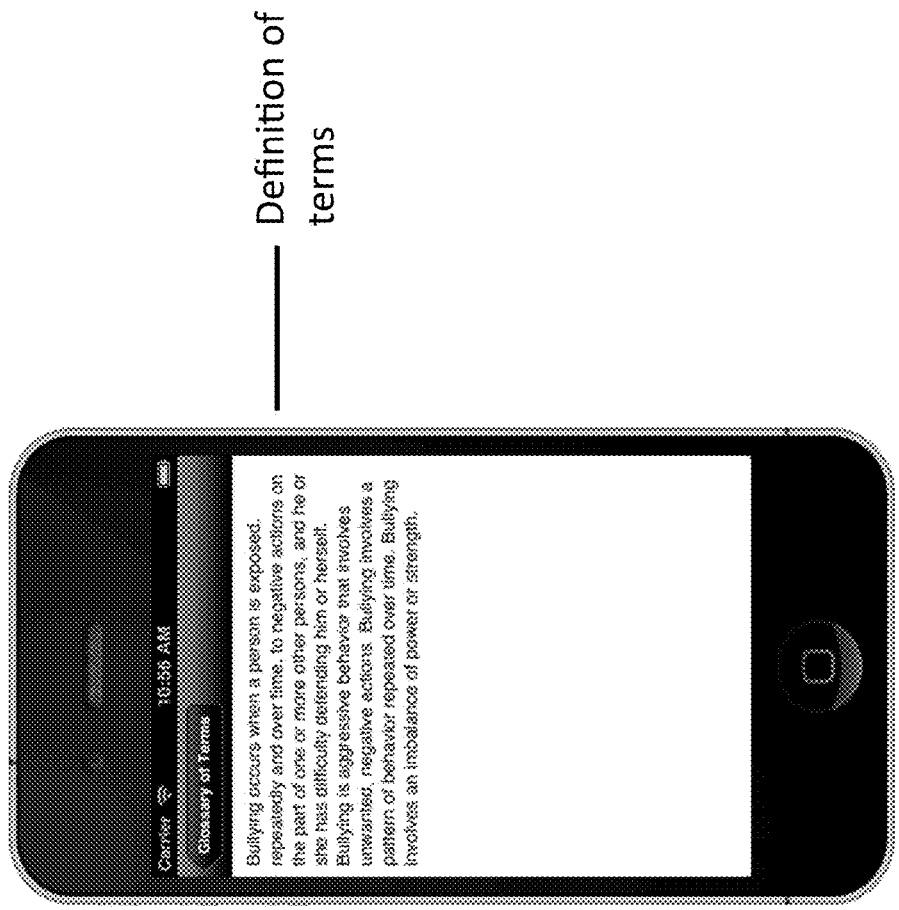
FIG.2Q Mobile Application Screen
Mobile Screen 13.

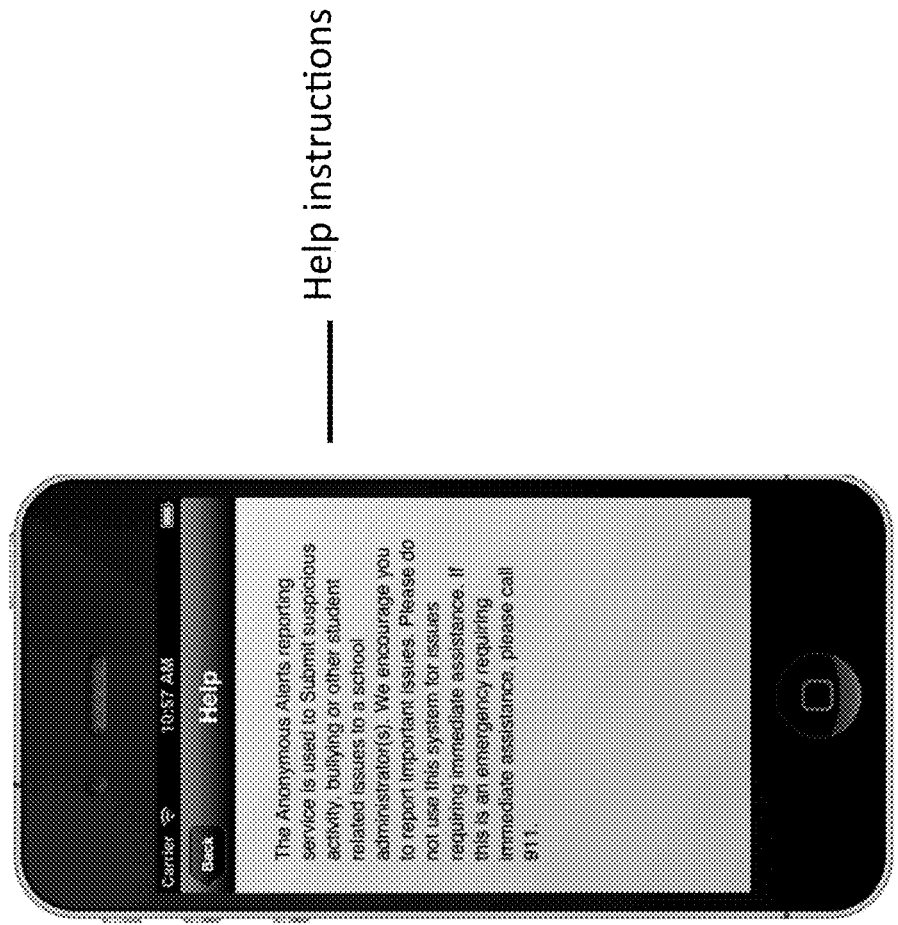
FIG.2R Mobile Application Screen
Mobile Screen 14.

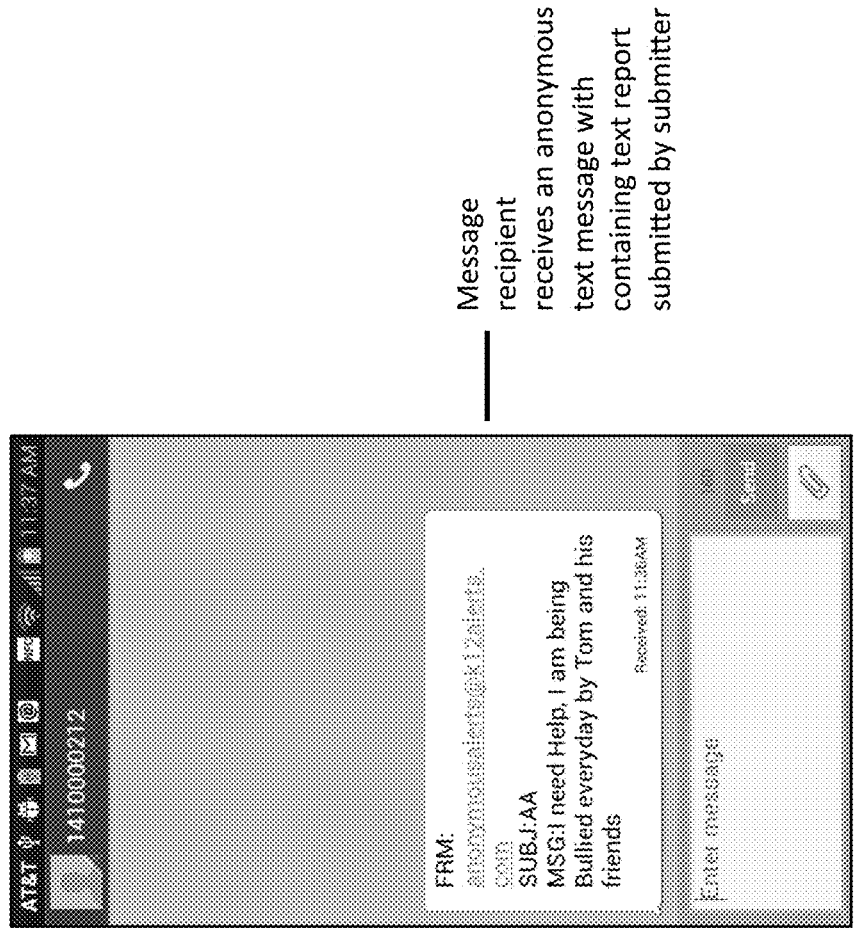
FIG.2S Message Receiver / Message Recipient
Mobile Screen 15.

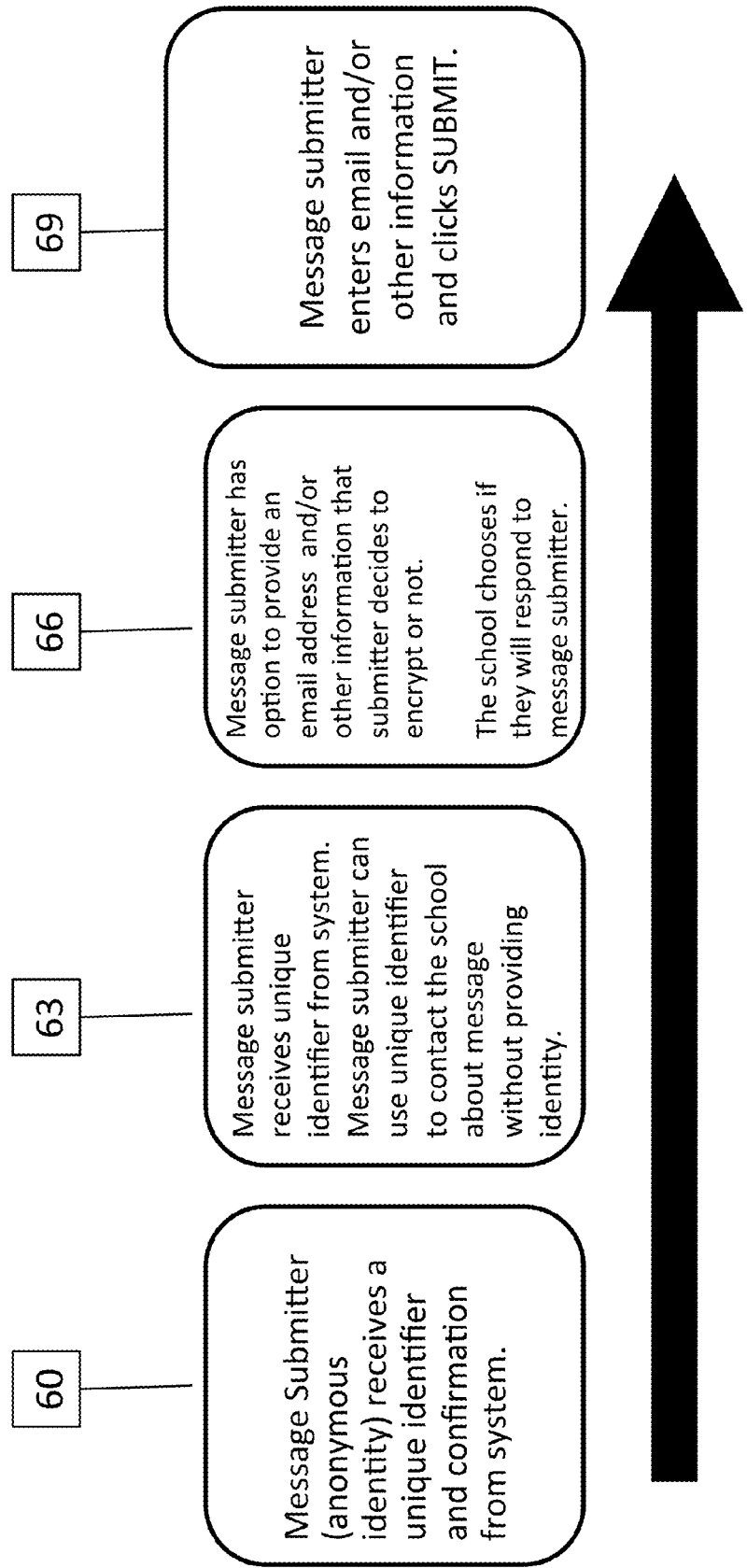

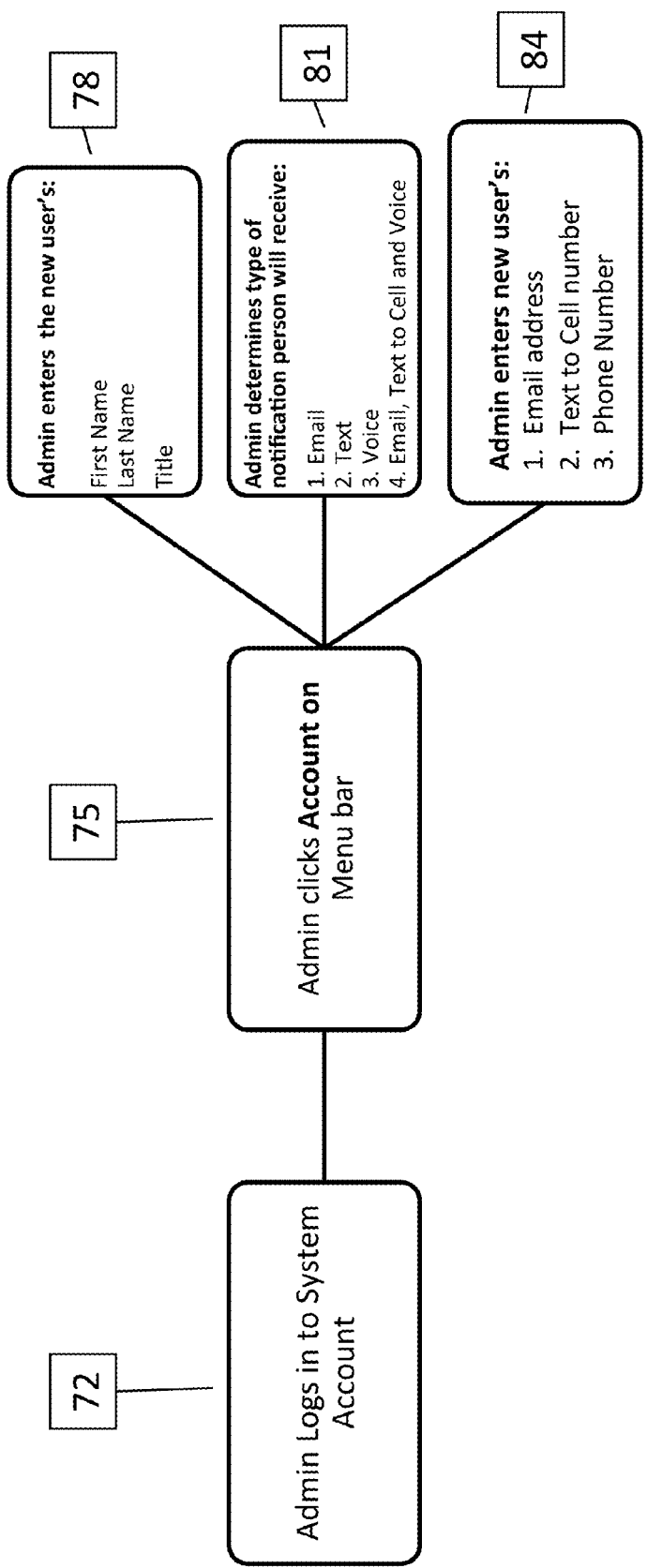

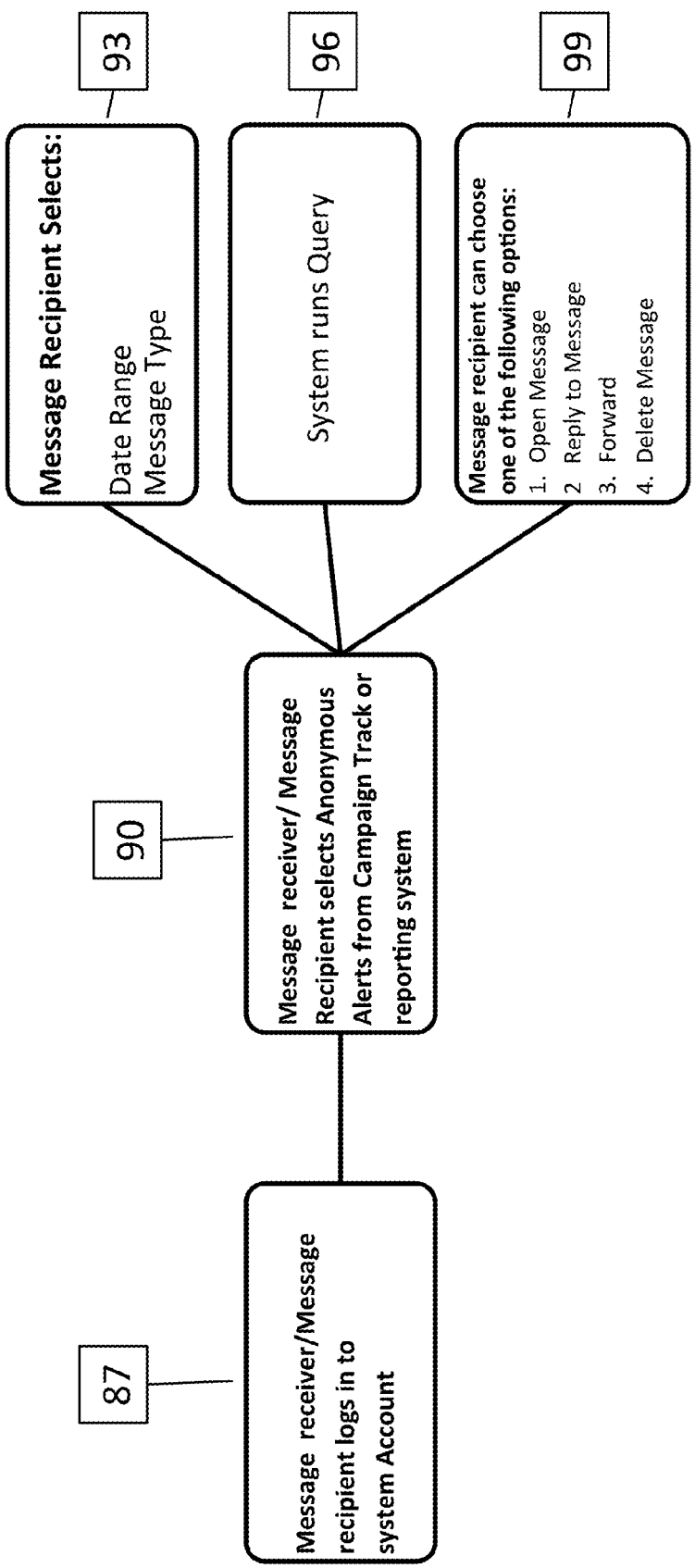
Fig. 5 Message Receiver/Message Recipient
Accessing Messages from Admin Interface

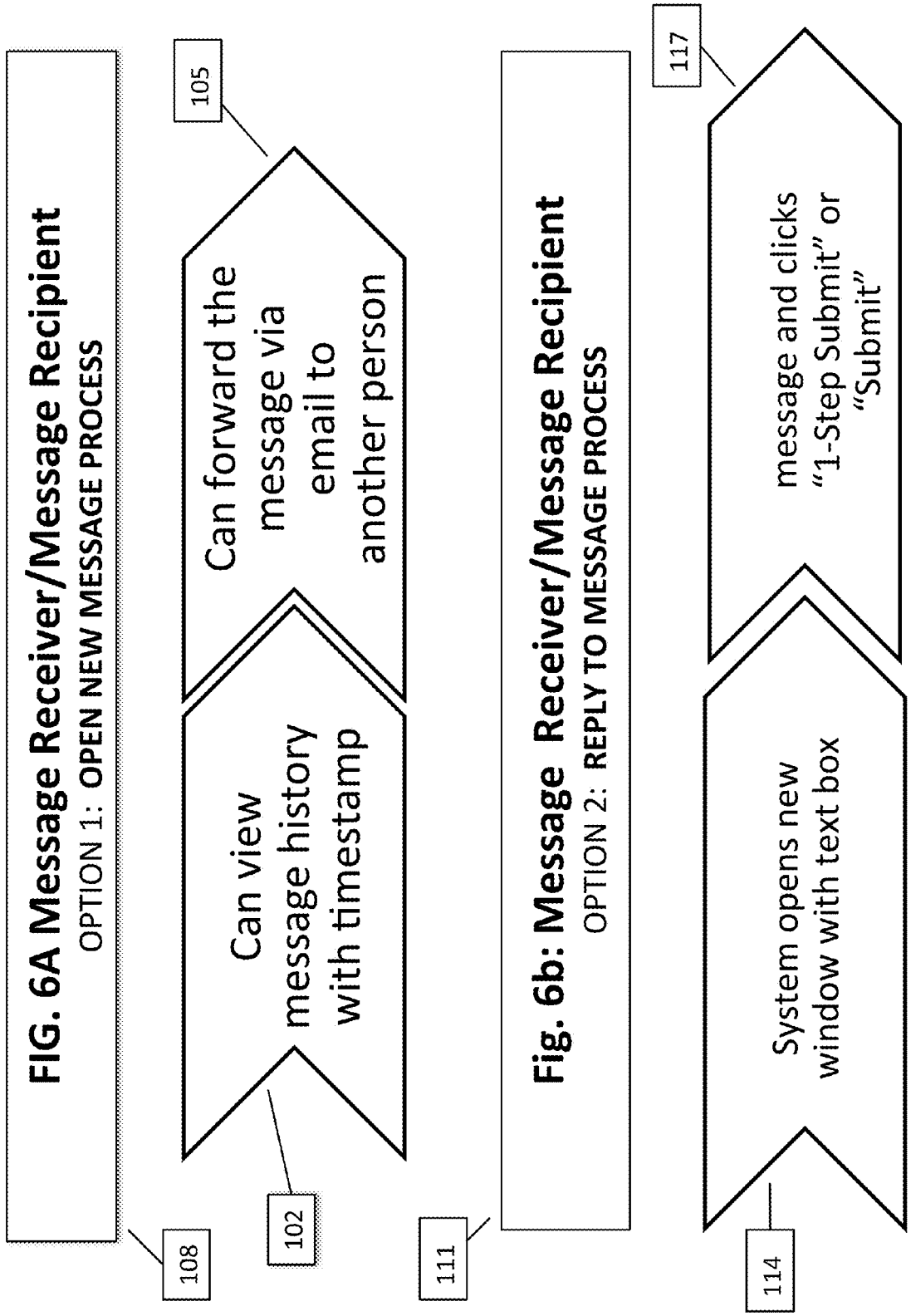

FIG. 7 Administrator User Setup Screen

FIG. 8 Anonymous Alert Report
(Search Options)

Anonymous Alerts Report

Search for Anonymous Messages Submitted

Beginning Search Date: [_____] (mm/dd/yyyy) Select Date

Ending Search Date: [_____] / [_____] (mm/dd/yyyy) Select Date

Anonymous Alert Type:
- Bullying
- Select Option
- Bomb Threat
- *[selected]*
- Cheating on schoolwork
- Cutting/Self-Injury
- Depression
- Drugs
- Family Issues
- Fighting
- Gang Related Issue
- Other
- Peer Pressure
- Sexual Harassment
- Stress Building: [Select Option]

Status: [Select Option]

Confirmation Code: [_____]

Location: [Select Option]

Credible: [Select Option]

[Search]

1, 2, 3 ... last >>

Page 1 of 14

| Date Submitted | Code | Anonymous | Priority | Message | Reply to | Credible | Status | |
|---|---|---|---|---|---|---|---|---|
| 2/22/2013 7:21 PM | 36299 | Bullying | Normal | Click Here | Click Here | YES | Open | Delete |
| 2/25/2013 2:19 PM | 65640 | Bullying | Normal | Click Here | N/A | YES | Open | Delete |
| 2/25/2013 4:54 PM | 42202 | Bullying | Normal | Click Here | N/A | YES | Open | Delete |
| 2/25/2013 5:01 PM | 25026 | Bullying | Normal | Click Here | N/A | YES | Open | Delete |
| 2/25/2013 8:33 PM | 35543 | Bullying | Normal | Click Here | N/A | YES | Open | Delete |

FIG. 9 Anonymous Alert Report
(System Query Results)

Anonymous Alerts Report

Search for Anonymous Messages Submitted

Beginning Search Date: [ ] / [ ] / [ ] (mm/dd/yyyy) Select Date

Ending Search Date: [ ] / [ ] / [ ] (mm/dd/yyyy) Select Date

Anonymous Alert Type: Bullying

Confirmation Code: [ ]

Building: Select Option

Location: Select Option

Status: Select Option

Credible: Select Option

[Pie Chart] [View All] [Search]

1 2 3 4 5 6 7 8 9 10 Next > Last >>

Page 1 of 14

| Date Submitted | Code | Anonymous Alert Type | Priority | Message | Reply-to | Credible | Status | |
|---|---|---|---|---|---|---|---|---|
| 2/22/2013 7:21 PM | 36299 | Bullying | Normal | Click Here | Click Here | YES | Open | Delete |
| 2/25/2013 2:19 PM | 66840 | Bullying | Normal | Click Here | N/A | YES | Open | Delete |
| 2/25/2013 4:54 PM | 42302 | Bullying | Normal | Click Here | N/A | YES | Open | Delete |
| 2/25/2013 5:01 PM | 25026 | Bullying | Normal | Click Here | N/A | YES | Open | Delete |
| 2/25/2013 5:33 PM | 35543 | Bullying | Normal | Click Here | N/A | YES | Open | Delete |

FIG. 10 Anonymous Alert Report
(View Message Screen)

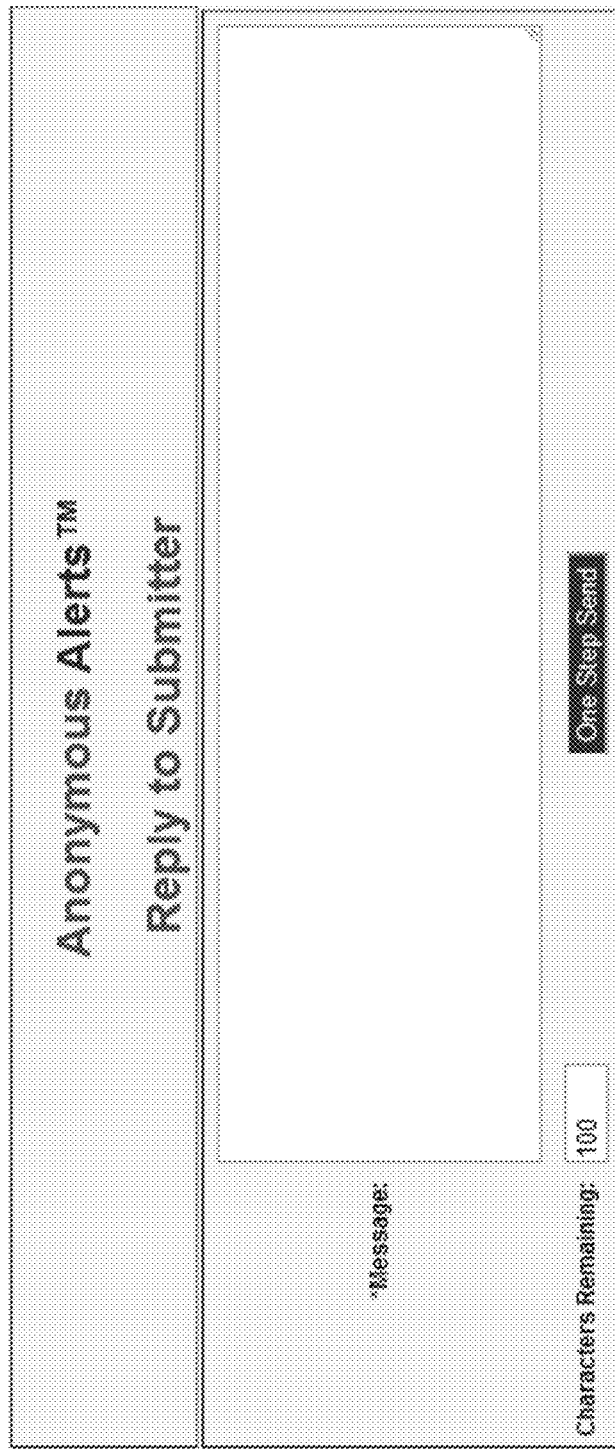
FIG. 11: Anonymous Alert Report
(Administrator Reply Screen)

FIG. 12 Message Submitter User Interface

FIG. 13: Message Submitter User Interface
(Report Incident Type drop-down list option)
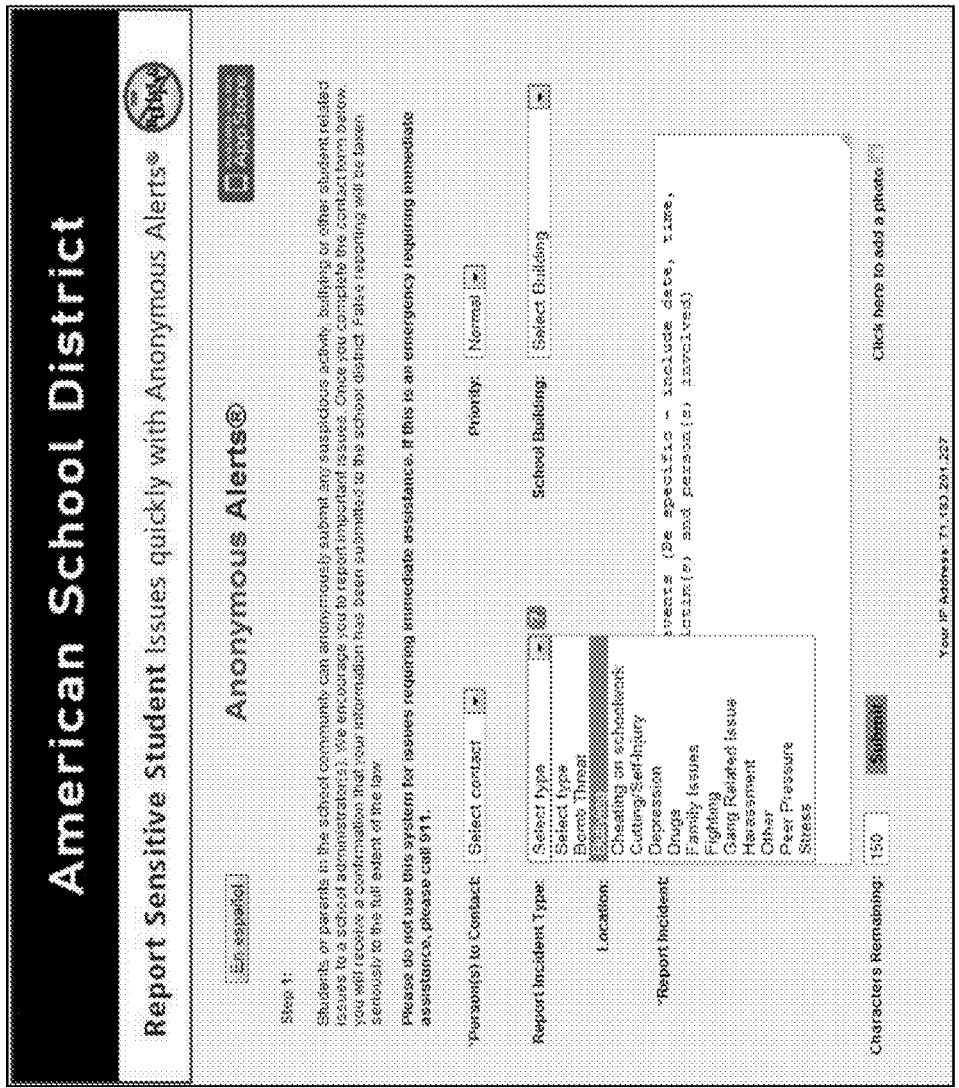

FIG. 14: Message Submitter User Interface
(Person of Contact drop-down list option)

FIG. 15 Message Submitter User Interface
(Confirmation that message was received)

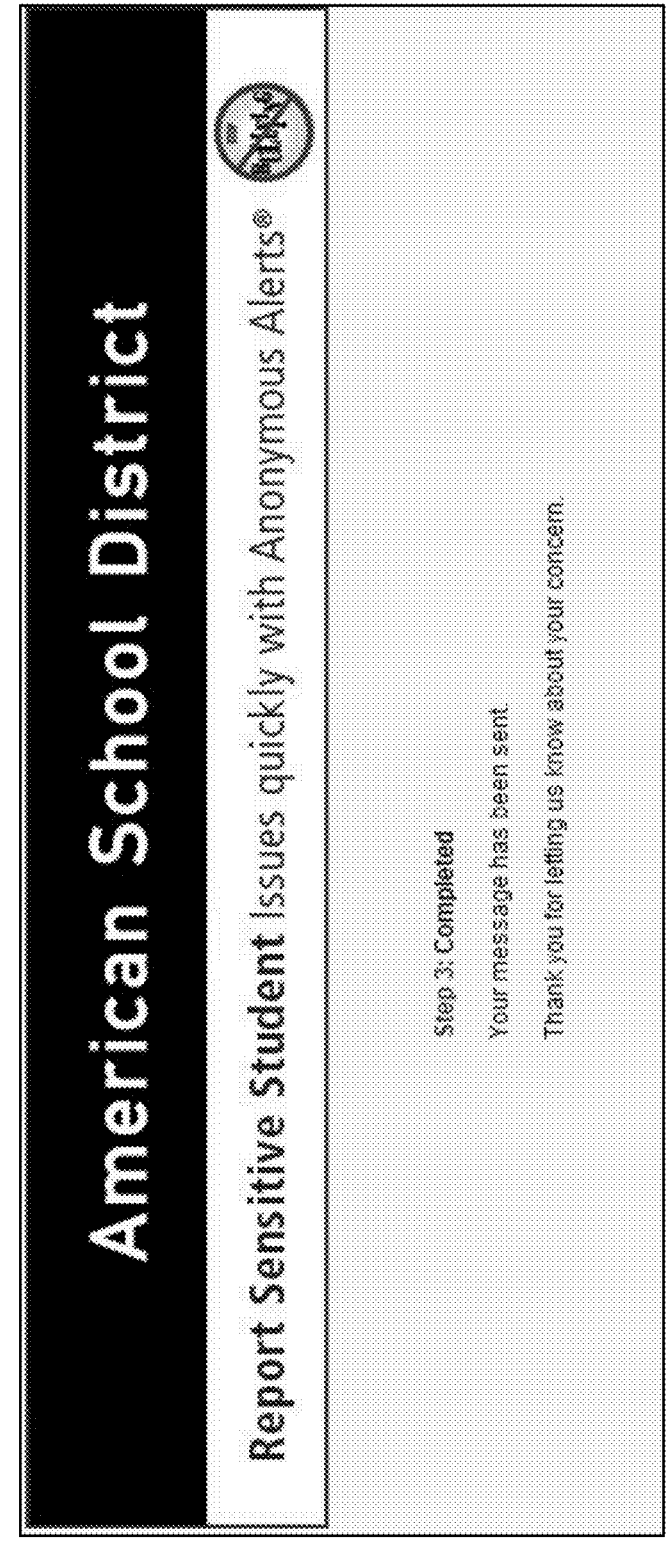
FIG. 16 Step 3

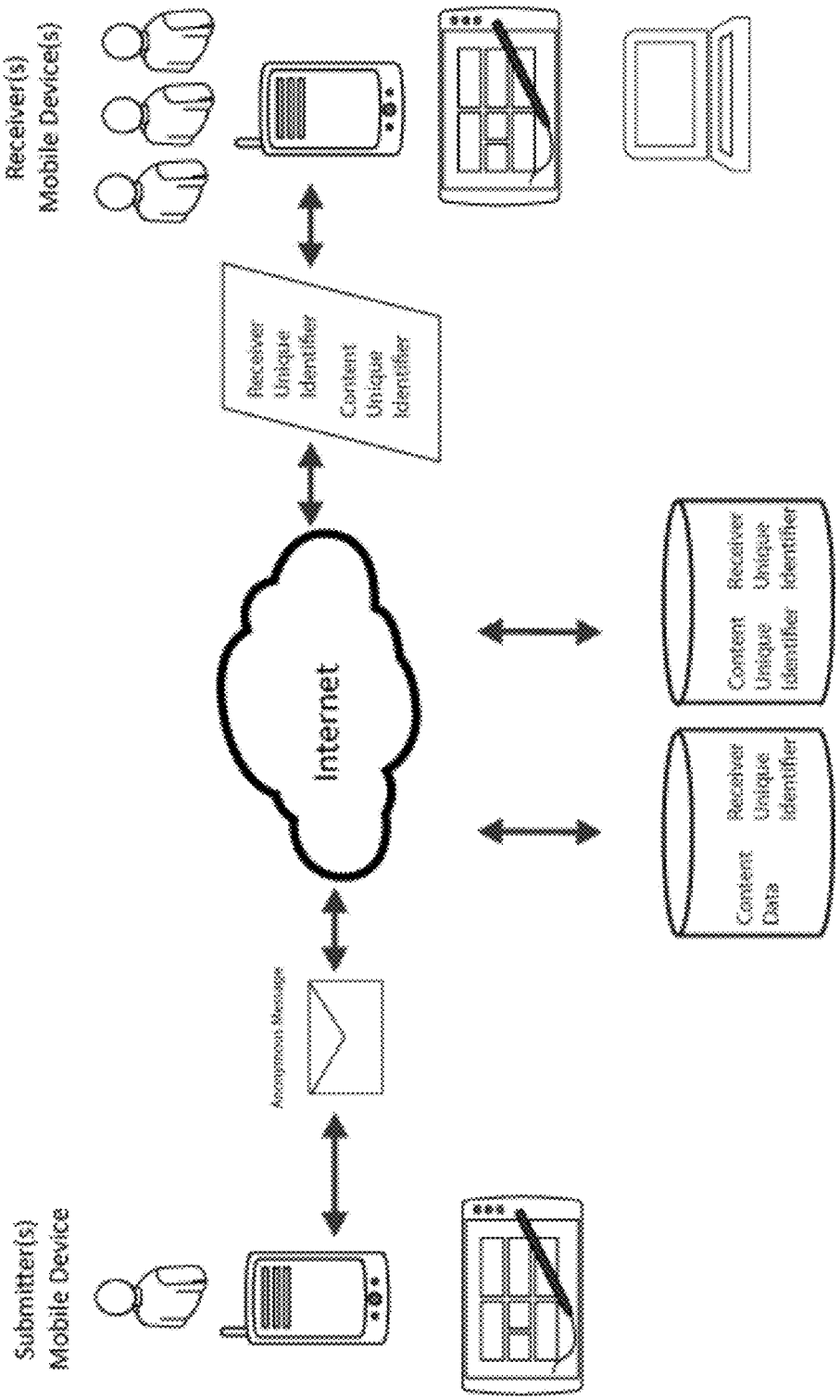
FIG. 20 Mobile to Mobile Message Sending and Receiving
with Unique Content Identifier and Receiver Unique Identifier

SYSTEM FOR SENDER/RECEIVER TO SEND OR RECEIVE MOOD RELATED, TIME SENSITIVE OR SECRETIVE CONTENT/MESSAGES

CLAIM OF PRIORITY

This application claims priority to Provisional Application for U.S. Patent No. 61/652,099, filed May 25, 2012, and Provisional Application for U.S. Patent No. 61/662,305, filed Jun. 20, 2012, which are incorporated herein by reference for all purposes.

FIELD OF INVENTION

The present invention relates to a system and method for sending, receiving, and responding to mood related, time-sensitive and/or secretive matter messages, through a one-step submission, anonymous submit process and a corresponding actionable and searchable administrative report generating process. More specifically, the invention relates to a system and method for permitting submitter(s) to anonymously submit information/content and send that information/content, by means of a user interface, to authorized receiver(s) who may access such information/content, which is encrypted, in whole or in part, and act, report, forward or respond accordingly.

BACKGROUND OF THE INVENTION

Prompt distribution of mood related, time-sensitive, and secretive, information is crucial to protection and authorized intervention concerning individual and community safety, and mitigating damage to persons, property and/or infrastructure. The advent of new methods of communication, such as e-mail, cell phones, instant messaging, Smart phones, tablets, computers, text messaging, and other Internet, world wide web, virtual network, and social media compatible devices has increased the ability to effectively communicate such mood related, time-sensitive, and secretive information to authorized individuals. As a result, it is advantageous for a specialized and focused information dissemination system to be adapted to utilize the Internet, virtual network, and/or social media for prompt and effective systems of notification and/or dissemination of sensitive information. Increased utilization of complex smart devices, tablets, mobile devices, associated mobile applications, and mobile icons, as well as, computers, e-mail, texting, instant messaging, and other communication devices and transmission methods can be exploited for their instant notification abilities, and their abilities to relay information back to authorized personnel in time sensitive situations.

A mobile application or mobile app as it is sometimes referred to, is a currently executing computer software application/program that can physically move information from one computer (mobile device) to another host server while it is being executed by the user/submitter. Mobile applications demonstrate many benefits and efficiencies and also immediacy of message/information distribution to an authorized host computer system.

One of the goals of this system is instant distribution of mood related, time-sensitive, and secretive, information to authorized persons identified by the system. One of the primary goals of this system and method is to enable persons to come forward with time sensitive and/or secretive information and submit it to authorized persons who can immediately respond to the information submitted.

SUMMARY OF INVENTION

It is an object of the present invention to send/submit, receive and disseminate mood related, time-sensitive, secretive, medical, and/or threatening information via multiple forms of communication and transmission to a designated, authorized, and/or skilled audience while maintaining the anonymity of the Submitter at the Submitter's discretion. In at least one embodiment of the invention, the communication can be responded to and/or forwarded with an encrypted identity, a "unique identifier", and/or code identified, and a sensitive message sent to a designated, authorized, and/or skilled audience.

The present invention provides a method and system for the Submitter to send and the Receiver to receive, in a one-click submission, time sensitive, mood related, secretive, medical, and/or threatening information, by means of at least one user interface (UI) of at least one input device, connected to at least one of the following: the Internet, a virtual network, social network, world wide web, WAN, and/or LAN to (a) send anonymous/non-anonymous communications from a Submitter which are encrypted (in whole or in part) through a secure connection/host system; (b) have authorized persons (Receiver(s)) receiving anonymous/non-anonymous communications from a Submitter; (c) correlate/associate the anonymous/non-anonymous communications input by the Submitter to aid in contacting appropriate receiving parties such as school officials, law enforcement, and/or health officials for sensitive information management of a student or other community member issues in reports or in taking other action.

The system and method comprises the following steps for communication of alert notifications to authorized personnel: providing each authorized administrator a "Receiver-unique identifier" for communication and/or system access; identifying each administrator to send and/or receive sensitive information; assigning encrypted information and/or other information/content and/or message(s). Having a unique identifier that matches the unidentified Submitter's personal information while still protecting the Submitter's anonymity to the authorized Receiver(s) and the data and information is stored in at least one database to be associated with the unique identifier, and the submitter communication is identified as being anonymous; encrypting and sometimes decrypting certain information for authorized Receiver(s)/personnel to view or respond to; and receiving the designation of social networking sites by the matching and use of the unique identifier(s) and social networking site entry codes.

The invention permits parents, students, staff/authorized personnel, and other members of the community to easily and effectively communicate time-sensitive, mood related, medical, threatening, and/or secretive information anonymously or non-anonymously, as desired by the Submitter. A user/Submitter, selecting even a single text, graphic, or other content selection or button from the user interface, or responding by voice to a voice query, can trigger a mood event and/or other type of message to be sent to the authorized Receiver(s) identifier(s) (e.g., a student or community member experiencing emotional distress). The Receiver(s) unique identifier(s) password, code, or pin can be solicited by the user/Submitter through a template to send a message to one or more Receiver (s) Unique Identifier(s) stored in at least one database.

A system and method for at least one Submitter to communicate information comprising sending an anonymous communication from the at least one Submitter, from at least one user-interface of at least one input device, connected to at least one of the Internet, a virtual network, social network, world wide web, WAN, and/or LAN, said anonymous communication containing information, encrypting the information in part or in whole, routing the encrypted information and any other information to be sent to at least one Receiver, generating at least one unique identifier, and sending at least one unique identifier and at least one confirmation message to the at least one Submitter, and sending at least one unique identifier, and any non-encrypted information to at least one Receiver. When the Submitter chooses to only be identified as being anonymous, the Submitter completes the anonymous e-mail address and/or text number entry field in the confirmation message and sends it to at least one Receiver(s) and to be encrypted and stored in at least one data base to be associated with the unique identifier, and the submitter communication is identified as being anonymous.

When the Submitter chooses to be identified as being non-anonymous, the Submitter may reveal information such as Submitter's name, e-mail address, phone number, phone text number or network identity code or location for non-anonymous communications to the at least one Receiver(s) and to be stored in at least one data base to be associated with the unique identifier, and the submitter communication is identified as being non-anonymous.

The communication is then identified as being anonymous or non-anonymous. At least one of at least one Receiver(s) can take an action and/or make a report based on the communication received from at least one Submitter. The information, in part or in whole can be comprised of at least one of mood related, time sensitive, medical, threatening, and/or secretive information. The information can be submitted in a one-click submission. Any submission of data can be made in a one-click submission which sends at least one unique identifier and any non-encrypted information to at least one Receiver via at least one of the following: text, e-mail, phone, instant message, social network transmission or communication, or data transmission. This can also include decrypting the encrypted information. At least one user-interface can be comprised of a mobile device, tablet, smart device, computer, voice prompt, phone, facsimile, or a part therein and/or associated software. At least one input device can be a mobile device, tablet, smart device, computer, voice prompt, phone, and/or facsimile. The information encrypted can be comprised of the identity of the Submitter. The communication sent can comprise of at least one of the following: an image, photo, text, video, sound file, and/or audio.

Upon the Receiver(s) sending the communication to a system administration device, and the system administration device receives a matching "Receiver's unique identifier" from a system administration user interface, the system administration device allows the opening and reading of the communication, forwarding of the communication, responding/replying to the communication, and/or deleting the communication. Each of at least one Receiver(s) of the communication can be selected by a host system administration device and given and/or selects an account, password, and/or pin wherein the recipient or Receiver of the communication will receive and/or view messages addressed specifically to that Receiver, wherein the system can receive a login-on a corresponding system user interface, the system matches the login with information stored in at least one data base and the system can allow opening and reading of the communication, forwarding of the communication, responding/replying to the communication, and/or deleting of the communication. The communication may be selected by matching the requested recipient/Receiver with data stored in a data base. The input may be received from the at least one Submitter utilizing a standardized template which may includes a drop-down list for selecting at least one Receiver, the computerized device receives a selection of at least one Receiver from the drop-down list within the standardized template, and the computerized device transmits the communication to at least one selected Receiver.

The standardized template drop-down lists may comprise at least one of the following; Receiver or recipient, priority level, type of incident, building, location, and/or other. The standardized template may include a choice for setting the level of priority that can be assigned to the communication; the level is one of "Urgent", "High", "Medium", "Normal", or "Low". The standardized template may include a drop-down list for selecting a type of communication; the types of communication comprise at least one of the following: stress, family, issues, harassment, stealing, drugs, bullying, weapons on campus, bomb threats, cheating on schoolwork, cutting/self-injury, cyber bullying, fighting, gang related issues and/or associations, peer pressure, sexual harassment, and/or depression or other customized type of communication. The standardized template may include a drop-down list for selecting a types of location; types of location include bus, cafeteria/lunchroom, classroom, hallway, auditorium, gymnasium, locker room, street, sidewalk, playground, bathroom, in town, sports field, Face book, instant messaging, face time, social media, i-message, e-mail, instant message, Twitter, telephone, Skype, YouTube or other customized type of location. The standardized template may have space or area for text/characters entry of anonymous content. The standardized template may have an area for the Submitter to type in a message containing anonymous content. The communication language may be selected by the Submitter from a choice of or drop down window displaying a selection of a variety of languages to pick from to read and/or communicate in. The Submitter can be an unidentified Submitter. The Submitter communication can be to an authorized person. The unique identifier can be revealed on at least one of the following: a mobile device, smart phone, tablet voice prompt, computer, and/or facsimile. The confirmation message may contain an anonymous e-mail address, phone number, phone text number, network identifying code and/or locater, or geographic locator. At least one authorized person(s) can send at least one response message anonymously back to at least one Submitter in response to the unique code and related content. The Submitter may select to reveal information such as the Submitter's name, e-mail address, phone number, phone text number, social network identity username, network identity code, and/or location, for non-anonymous communications to the at least one Receiver. At least one Submitter may submit an anonymous message to at least one Receiver(s) on at least one of a mobile device, computer, fax, facsimile machine, phone, tablet, and/or smart device. At least one Submitter may submit information as at least one message via at least one user-interface using at least one standardized template on at least one mobile device. The information, in part or in whole may be comprised of at least one of the following types of information: mood related, time sensitive, medical, threatening, or secretive. At least one Receiver can communicate directly with at least one Submitter and vice versa in an anonymous 2-way text to cell communication about the information, and the 2-way communication is between the sender/Submitter and the Receiver. At least one Receiver can communicate directly with at least one Submitter and vice versa in an anonymous 2-way voice communications about the information, and the 2-way communication is between the sender/

Submitter and the Receiver. At least one Receiver can communicate directly with the at least one Submitter and vice versa in an anonymous 2-way Social Media communication about the information, and the 2-way communication is between the sender/Submitter and the Receiver. At least one Receiver can communicate directly with the at least one Submitter and vice versa in at least one 2-way texting between Submitter and Receiver anonymously, and the 2-way communication is between the sender/Submitter and the Receiver. At least one Receiver can communicate directly with the at least one Submitter and vice versa in a 2-way phone communication anonymously, and the 2-way communication is between the sender/Submitter and the Receiver. At least one Receiver can communicate directly with the at least one Submitter and vice versa in an anonymous 2-way communication about the information, and this conversation between the sender/Submitter and the Receiver is via any transmission means. At least one Receiver(s) can send at least one response message back to at least one Submitter in response to the unique identifier and related content. At least one Submitter may submit a non-anonymous message to at least one Receiver(s) on at least one of the following: a mobile device, computer, fax, facsimile machine, phone, tablet, and/or smart device. At least one Submitter may submit information as at least one message via at least one user-interface using at least one standardized template on at least one mobile device and/or smart phone. At least one Receiver can further communicate directly with at least one Submitter and vice versa in a 2-way text to cell communication about the information. At least one Receiver can further communicate directly with at least one Submitter and vice versa in a 2-way voice communication about the information. At least one Receiver can communicate directly with at least one Submitter and vice versa in a 2-way Social Media communication(s) about the information. At least one Receiver can communicate directly with at least one Submitter and vice versa in at least one 2-way texting between Submitter and Receiver. At least one Receiver can communicate directly with the at least one Submitter and vice versa in a 2-way phone communication. At least one Receiver can communicate directly with the at least one Submitter and vice versa in a 2-way communication about the information, and this conversation between the sender/Submitter and the Receiver is via any known transmission means.

The unique identifier is generated using at least one unique algorithm. A non-transitory storage device can store a plurality of instructions for at least one message the Submitter can send in one-click, which can be mood related, time sensitive, or secretive information, wherein the non-transitory storage device comprises a plurality of instructions for sending an anonymous communication from at least one Submitter, from at least one user-interface of at least one input device, connected to at least one of the following: the Internet, a virtual network, social network, world wide web, WAN, and/or LAN, and anonymous communication containing information, encrypting the information in part or in whole, routing the encrypted information and any other information to be sent to at least one Receiver, generating at least one unique identifier, and sending at least one unique identifier and at least one confirmation message to at least one Submitter, and sending at least one unique identifier and any non-encrypted information to at least one Receiver. The instructions further comprise a step when the Submitter chooses to only be identified as being anonymous, and the Submitter completes the anonymous e-mail address and/or text number entry field in the confirmation message and sends it to at least one Receiver (s). The instructions can further comprise a step when the Submitter chooses to be identified as being non-anonymous, wherein the Submitter may reveal information such as the Submitter's name, e-mail address, phone number, phone text number, and/or network identity code and/or location for non-anonymous communications to at least one Receiver(s). The instructions can further comprise a step, wherein the communication can be identified as being anonymous or non-anonymous. The instructions can further comprise a step of at least one Receiver(s) choosing to take an action and/or making a report based on the communication received from the at least one Submitter. The instructions can further comprise a step, wherein the information, in part or in whole is comprised of at least one of mood related, time sensitive, medical, threatening, and/or secretive information. The instructions can further comprise a step, wherein the information is submitted in a one-click submission. The instructions can further comprise a step, wherein any submission of data is made in a one-click submission. The instructions can further comprise a step, wherein the sending of at least one unique identifier and any non-encrypted information to at least one Receiver is via at least one of the following: by text, e-mail, phone, instant message, social network transmission or communication, or data transmission. The instructions can further comprise a step of decrypting the encrypted information. The instructions can further comprise a step, wherein at least one user-interface is comprised of a mobile device, tablet, smart device, computer, voice prompt, phone, facsimile, or a part therein and/or associated software. The instructions can further comprise a step, wherein at least one input device is a mobile device, tablet, smart device, computer, voice prompt, phone, and/or facsimile. The instructions can further comprise a step, wherein the information encrypted is comprised of the identity of the Submitter. The instructions can further comprise a step, wherein the communication sent comprises of at least one of the following: an image, photo, text, video, sound file, and/or audio. The instructions can further comprise a step, whereby upon the Receiver(s) sending the communication to a system administration device, that the system administration device receives a "Receiver's unique identifier" from a system administration user interface that matches, and the system administration device allows the opening and reading of the communication, forwarding of the communication, responding/replying to the communication, and/or deleting of the communication. The instructions can further comprise a step, wherein each of at least one Receiver (s) of the communication is selected by a host system administration device and given and/or selects an account, password, and/or pin wherein the Receiver of the communication will receive and/or view messages addressed specifically to that Receiver, and the system can receive a login on a corresponding system user interface and the system can match the login with information stored in at least one data base and the system may allow opening and reading of the communication, forwarding of the communication, responding/replying to the communication, and/or deleting of the communication. The instructions can further comprise a step where the communication is selected by matching the requested recipient/Receiver with data stored in a data base. The instructions can further comprise a step wherein the input is received from the at least one Submitter utilizing a standardized template. The instructions can further comprise a step wherein the standardized template may include a drop-down list for selecting at least one Receiver, the computerized device receives a selection of at least one Receiver from the drop-down list within the standardized template, and the computerized device transmits the communication to at least one selected Receiver. The instructions can further comprise a step wherein the standardized template drop-down lists may comprise at least one of the following: Receiver, priority level, type of incident, building, location, and/or other. The instructions can further comprise a step, wherein the standardized template may include a choice for setting the level of priority that can be assigned to the communication; the level is one of "Urgent", "High", "Medium", "Normal", or "Low". The Instructions can further comprise a step wherein "Normal" is the default setting within the standardized template. The instructions can further comprise a step wherein the standardized template includes a drop-down list for selecting a type of communication; the types of communication comprise of at least one of the following: stress, family, issues, harassment, stealing, drugs, bullying, weapons on campus, bomb threats, cheating on schoolwork, cutting/self-injury, cyber bullying, fighting, gang related issues and/or associations, peer pressure, sexual harassment, and/or depression or other customized type of communication. The instructions can further comprise a step wherein the standardized template includes a drop-down list for selecting a types of location; types of location include bus, cafeteria/lunchroom, classroom, hallway, auditorium, gymnasium, locker room, street, sidewalk, playground, bathroom, in town, sports field, Face book, instant messaging, face time, social media, i-message, e-mail, instant message, Twitter, telephone, Skype, YouTube and/or other customized type of location. The instructions can further comprise a step wherein the standardized template has space or area for text/characters entry of anonymous content. The instructions can further comprise a step wherein the standardized template has an area for the Submitter to type in a message containing anonymous content. The instructions can further comprise a step wherein the communication language can be selected by the Submitter from a choice of, or drop down window displaying, a selection of a variety of languages to pick from to read and/or communicate in. The instructions can further comprise a step wherein the Submitter is an unidentified Submitter.

The instructions can further comprise a step wherein the Submitter communication is to an authorized person. The instructions can further comprise a step wherein the unique identifier is revealed on at least one of the following: a mobile device, smart phone, tablet, voice prompt, phone, facsimile, and/or computer. The instructions further can comprise a step wherein the confirmation message contains at least one of an anonymous e-mail address, phone number, phone text number, network identifying code and/or locater, and/or geographic locater. The instructions further can comprise a step, further comprises that at least one authorized person(s) can send at least one response message anonymously back to at least one Submitter in response to the unique code and related content. The instructions can further comprise a step wherein the Submitter may select to reveal information such as the Submitter's name, e-mail address, phone number, phone text number, social network identity username, network identity code, and/or location, for non-anonymous communications to at least one Receiver. The instructions can further comprise a step wherein at least one Submitter may submit an anonymous message to at least one Receiver(s) on at least one of a mobile device, computer, fax, facsimile machine, phone, voice prompt, tablet, and/or smart device. The instructions further can comprise a step wherein at least one Submitter may submit information as at least one message via at least one user-interface using at least one standardized template on at least one of a mobile device. The instructions further can comprise a step wherein the information, in part or in whole is comprised of at least one of mood related, time sensitive, medical, threatening, or secretive information. The instructions further can comprise a step wherein at least one Receiver can communicate directly with at least one Submitter and vice versa in an anonymous 2-way text to cell communication about the information, and the 2-way communication is between the sender/Submitter and the Receiver. The instructions further can comprise a step wherein at least one Receiver can communicate directly with at least one Submitter and vice versa in an anonymous 2-way voice communication(s) about the information, and the 2-way communication(s) is between the sender/Submitter and the Receiver. The instructions further can comprise a step wherein at least one Receiver can communicate directly with at least one Submitter and vice versa in an anonymous 2-way Social Media communication(s) about the information, and the 2-way communication(s) is between the sender/Submitter and the Receiver. The instructions further can comprise a step wherein at least one Receiver can communicate directly with at least one Submitter and vice versa in at least one 2-way texting between Submitter and Receiver anonymously, and the 2-way communication is between the sender/Submitter and the Receiver. The instructions can further comprise a step wherein at least one Receiver can communicate directly with at least one Submitter and vice versa in a 2-way phone communication anonymously, and the 2-way communication is between the sender/Submitter and the Receiver. The instructions can further comprise a step wherein at least one Receiver can communicate directly with at least one Submitter and vice versa in an anonymous 2-way communication about the information, and this conversation between the sender/Submitter and the Receiver is via any transmission means. The instructions can further comprise a step wherein at least one Receiver(s) can send at least one response message back to the at least one Submitter in response to the unique identifier and related content. The instructions further can comprise a step wherein at least one Submitter may submit an non-anonymous message to at least one Receiver(s) on at least one of a mobile device, computer, fax, facsimile machine, phone, tablet, voice prompt, and/or smart device. The instructions can further comprise a step wherein at least one Submitter may submit information as at least one message via at least one user-interface using at least one standardized template on at least one mobile device and/or smart phone. The instructions can further comprise a step wherein at least one Receiver can further communicate directly with at least one Submitter and vice versa in a 2-way text to cell communication about the information, and between the sender/Submitter and the Receiver. The instructions can further comprise a step wherein at least one Receiver can further communicate directly with at least one Submitter and vice versa in a 2-way voice communications about the information, and between the sender/Submitter and the Receiver. The instructions can further comprise a step wherein at least one Receiver can communicate directly with at least one Submitter and vice versa in an 2-way Social Media communications about the information, and between the sender/Submitter and the Receiver. The instructions can further comprise a step wherein at least one Receiver can communicate directly with at least one Submitter and vice versa in at least one 2-way texting between Submitter and Receiver. The instructions can further comprise a step wherein at least one Receiver can communicate directly with at least one Submitter and vice versa in a 2-way phone communication over phone, "2-way talk". The instructions can further comprise a step wherein at least one Receiver can communicate directly with at least one Submitter and vice versa in any 2-way communication about the information, and this conversation between the sender/Submitter and the Receiver is via any type of transmission.

The instructions can further comprise a step wherein the unique identifier is generated using at least one unique algorithm.

Prior to sending an anonymous communication from the at least one submitter, Submitter may activate an icon on at least one of a computer, mobile device, smart device, or tablet. The submitter can enter in log in screen of the application, information including a unique code identifier, After activating an icon on at least one of a computer, mobile device, smart device, or tablet the submitter can enter in a login screen of the application, information including a unique code identifier "UCI", The Unique Code Identifier "UCI" functions for use in identifying the community and act as a location finder to quickly identify which community the anonymous submitter wants to communicate with or is located in or near. This UCI is usually submitted to Authorized Persons and/or administrators to disseminate with-in the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified authorized Receiver(s) or Receiver group(s). The UCI can determine or establish the permissions for locating a specific community and its location.

Submitter can utilize the activated application to send, mood related, time sensitive, or secretive information, sending an anonymous communication, said anonymous communication containing information, encrypting the information, in part or in whole, routing the encrypted information and any other information to be sent to at least one receiver, generating at least one unique identifier, and sending the at least one unique identifier and at least one confirmation message to the at least one submitter, and sending the at least one unique identifier, and any non-encrypted information to the at least one receiver. Submitter can receive a selection command from the submitter/user, said submitter/user typing in a message and/or selecting a photo/image/sound or video to upload to the system receiving a unique identifier with message confirmation. Submitter can receive a selection command from the submitter/user by clicking on an icon, said icon appearing on a user screen; said icon capable of said submitter/user typing in a message and/or selecting a photo/image/sound or video to upload to the system receiving a unique identifier with message confirmation.

The user screen can be a mobile user device.

The invention can include a data server, wherein said icon capable of communicating said submitter message to said data server using a unique identifier, one can be using a search module, said search module capable of searching said database. The non-transitory storage device further can comprise instructions for having a data base, and icon capable of communicating said submitter message to said data server using unique identifier. The system and method can further comprise the step of using a search module to search a database. The system and method of claim wherein said application(s) are native applications specific to the device being used. The system and method can further comprise the step of, prior to sending an anonymous communication from the at least one submitter, activating an icon on at least one of a computer, mobile device, Mobil phone, smart pad, electronic device, input device, communication device, touchscreen computing device, portable media player, smart device, or tablet to provide an activated application and open a log-in screen. The system and method can further comprising a step of inputting a unique code identifier "UCI" on the log-in screen. The system and method wherein the unique code identifier "UCI" can also identify which community the anonymous submitter (s) wants to communicate with or is located in or near, and can further comprise the step of submitting the UCI to authorized person(s) and/or administrator(s) to disseminate the UCI with-in the community and surrounding areas so the UCI can be utilized by submitter person(s) and/or groups(s) in or near the community for sending anonymous communications to a specified authorized receiver(s) or receiver group(s). The system and method can further comprise the steps of locating the submitter(s) using a geographic locater, and/or global positioning system (GPS) providing the submitter's location to a host system for submission to receiver(s). The system and method wherein the geographic locater may be sending and/or transmitting to/from the submitter's, receiver's, and/or the administrator's mobile device.

The system and method can further comprise the step of utilizing the activated application to send information. The system and method can further comprise the step of utilizing the activated application to send, mood related, time sensitive, or secretive information, sending an anonymous communication, said anonymous communication containing information, encrypting the information, in part or in whole, routing the encrypted information and any other information to be sent to at least one receiver, generating at least one unique identifier, and sending the at least one unique identifier and at least one confirmation message to the at least one submitter, and sending the at least one unique identifier, and any non-encrypted information to the at least one receiver. The system and method can further comprise the steps of the system receiving at least one selection command from the submitter; the submitter typing in a message/information and/or selecting a photo/camera function/image/text/film/audio/file/content/sound or video to upload to the system; and the submitter, after sending a submission/communication, receiving a communication comprising a unique identifier and a message confirmation.

BRIEF DESCRIPTION OF DRAWINGS

FIG. 2 depicts the flow of creating a new anonymous/non-anonymous mood related or time-sensitive or secretive message for submission.

FIG. 2A—screen shot of photo upload screen, 64 choose file, 59 upload button.

FIG. 2B—screen shot of Selecting the image, depicts the selection of an image or other content or text to upload; 68 selects picture to upload.

FIG. 2C—screen shot of uploading an image.

FIG. 2D—screen shot of cropping an image, with crop button 67, and submit/cancel 61.

FIG. 2E—depicts a smartphone with the Anonymous Alerts Icon. Submitter clicks the mobile application icon to startup/initiate mobile application.

FIG. 2F—depicts the log-in screen of the mobile application for Anonymous Alerts where a Submitter enters a unique Code Identifier "UCI" and password to activate Community View and submit anonymous messages to authorized Receiver(s)/Recipient(s). The Unique Code Identifier "UCI" functions for use in identifying the community and acts as a location finder to quickly identify which community the anonymous submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified and authorized Receiver(s) or Receiver group(s). The UCI can determine or establish the permissions for locating a specific community and its location.

FIG. 2G—submitter message submission screen wherein the Submitter chooses to select "Send Incident Report" or "Glossary" to access definition of terms or "Help".

FIG. 2H—submitter message submission screen after the Submitter chooses to select "Send Incident Report", which includes several entry fields, a message field, and submit or send button.

FIG. 2I—submitter message submission screen after the Submitter chooses to select "Send Incident Report" which includes several entry fields and Submitter can select location with a picker that is data driven with custom locations.

FIG. 2J—submitter message submission screen after the Submitter chooses to select "Send Incident Report" which includes several entry fields including an anonymous message screen.

FIGS. 2K and 2L—submitter is prompted to upload an image (upload, or take picture then upload) at the Submitter's discretion if the Submitter has an image to upload about an incident report or other message/information. Various choice options are shown.

FIG. 2M confirmation screen showing that image or other content has been successfully uploaded.

FIGS. 2N and 2O—mobile Application Screens—sending at least one unique identifier and at least one confirmation message to at least one submitter, and sending at least one unique identifier, and any non-encrypted information to at least one receiver. The submitter can choose to remain anonymous, send the anonymous e-mail address and/or text number in the entry field in the confirmation message, then submit this information to be encrypted and stored. Alternatively, the submitter can choose to be non-anonymous, and reveal information such as the Submitter's name, e-mail address, phone number, phone text number or network identity code or location for non-anonymous communications.

FIG. 2P—depicts "Glossary of Terms" screen. Can include community-specific customized terms.

FIG. 2Q—screen for "Definition of Terms" in the drop down menus.

FIG. 2R—help Screen on mobile device.

FIG. 2S—screen Shot of Receiver's smart phone device depicting a message being received from an anonymous Submitter.

FIG. 3 depicts the Message Submitter flow of automated operations that occur following the creation and submission of an anonymous/non-anonymous alert message.

FIG. 4 depicts the flow of an Administrative User's Account Setup process for a message recipient.

FIG. 5 depicts the flow of how a message Receiver or recipient accesses a message from the administrative interface.

FIG. 6A depicts option 1 when viewing new sensitive content message with ability to forward message via e-mail to another party.

FIG. 6B depicts option 2 when viewing new message for Message Recipient to reply to Message Submitter.

FIG. 7 is a screenshot of a system where an Administrator can setup a user account.

FIG. 8 is a screenshot of the possible types of alerts for an anonymous/non-anonymous alert report.

FIG. 9 is a screenshot of system query results that a Message Recipient may search.

FIG. 10 is a screenshot of a message screen containing an original message, related message history, and reply/forwarding options by an administrative user.

FIG. 11 is a screenshot of a reply screen for an administrative user.

FIG. 12 is a screenshot of an example of the Message Submitter's User Interface.

FIG. 13 is a screenshot of an example of the Message Submitter's message type drop-down list options.

FIG. 14 is a screenshot of an example of the Message Submitter's person of contact drop-down selection options.

FIG. 15 is a screenshot of a confirmation that the Message Submitter's submission was received.

FIG. 16 depicts an example of a mobile or smart phone screen having a downloaded application of the system and method of the invention.

FIG. 20—Depicted by FIG. 20, A Mobile to Mobile Message Sending and Receiving.

DETAILED DESCRIPTION OF DRAWINGS

Figure 1:
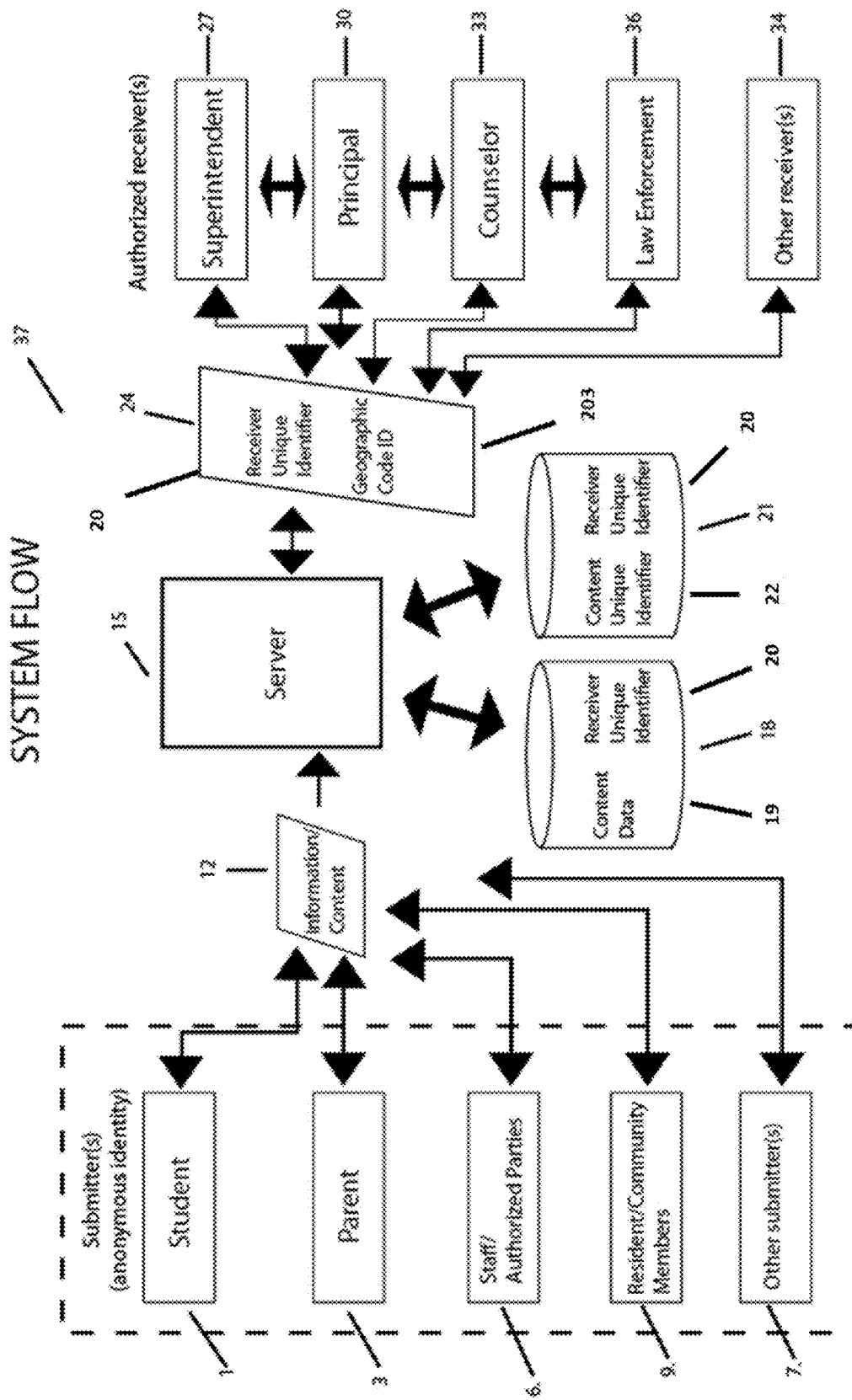
FIG. 1 is a schematic view of the operation of the system for receiving and responding to mood related or time-sensitive or secretive information, content, and/or messages.

The basic components of the system for receiving and responding to mood related or time-sensitive content matter messages in accordance with the invention are illustrated by FIG. 1. The system 37 includes a server 15 (and 540), that is accessible by Submitter(s) comprising of at least one student (s) 1, parent(s) 3, staff/authorized parties 6, residents/community members 9 of the community, and/or other Submitter (s) 7 via a network that is connected to the Internet, world wide web, any virtual network, a WAN (wide-area network), and/or LAN (local-area network). The server 15 (and 540) is connected to at least one of the databases 18, in conjunction with 21, which uniquely identifies content, messages, identity information, and information/content data 12 and matches the submission to the authorized receiving party(s) designated to receive the submission. The database 18 enables encryption of the identity and/or content data and generates a Content Unique Identifier 22 for the Submitter identifying content so that it is anonymously sent to the intended recipient (s). The system 37 is anchored through the Internet, a virtual network, WAN and/or LAN and is, thus, accessible by personal computer, PDA, tablet, smartphone, mobile device, or other device with Internet, virtual network, WAN, and/or LAN connectivity.

Similarly depicted by FIG. 1, the system 37 is also accessible via the Internet, a virtual network, WAN, and/or LAN by authorized person(s)/receiver(s) such as school superintendent 27, principal 30, counselor 33, law enforcement official (s) 36, and/or other receiver(s) 34. Because of the inventive network's use of the Internet, a virtual network, WAN, and/or LAN, this information is accessible to administrators via personal computer, PDA, mobile device, smart phone, tablet, or other device with Internet, a virtual network, WAN, and/or LAN connectivity.

As a result of this accessibility, school administrators and other personnel are able to access messages, by log-in using Receiver Unique Identifier 20 which is verified by Host Administration Device 21, to which they are an intended recipient, and communicate with the submitting party, or forward the received message to other parties via e-mail, text, and/or other communication methods.

Depicted in FIG. 2 is the system's 37 accessibility via the cloud 39 (and 530), which can be any or all of the following: the Internet, a virtual network, social network, world wide web, WAN, and/or LAN.

Referring to FIG. 2, an embodiment of a Message Submitter screen 1 is shown. In the embodiment of FIG. 2, a person who would like to submit a message ("Message Submitter" or "Submitter") may optionally select to download a smart device application by clicking or selecting the application icon located on screen 1, 53, and continue the process from the smart device or continue on screen 1 by first selecting the message window 42 from the designated website or application, optionally selecting from the language choices available 43 (The current default is English), and then will select and identify the Person(s)/receiver(s) to Contact 45 to receive the message from a drop-down menu. The Message Submitter may then select a level of priority 48, While the default level in the current embodiment is set to "Normal", a Submitter may indicate that the content of the message is of "High Priority" or one of the other choices being offered. The Submitter may then select a particular Message Type "incident type" 51, which is the character of the message they are sending from the options provided in the drop-down selection (i.e., Bullying, Peer pressure, bomb threat, other school threat, etc.). Submitter also may choose School building type 44, and location there within 52, and a Message Submitter will type a free-form message 54. This embodiment allows for a free-form message. Then the submitter may select a request by checking the box or other indication to add other content to the submission comprising images, text, photos, video, film, sound bites, or other content 56. Lastly, the Submitter would click the graphic icon "1-Step Submit" 57 to submit the message to the receiving and/or corresponding party via a one-click submission process.

FIGS. 2A-D are screen shots dealing with selecting and manipulating images to be sent. The Message Submitter if desired can alternatively and choose at least one file, 64, (FIG. 2B Choice screen appears for selecting) than select to upload or cancel 59, at least one photo or other content/data from a computer, tablet, smartphone, etc. with or without text. Additionally, the photo can be uploaded from an app, a library, or a photo taken by a phone, tablet or similar device, with the submission comprising images, text, photos, video, film, sound bites, or other content. FIG. 2D shows the ability to make adjustments such as cropping 67 to the selected content prior to submission. To submit select Submit 61.

FIG. 2E—Depicts a smartphone with the Anonymous Alerts Icon. Submitter clicks the mobile application icon to startup/initiate mobile application.

FIG. 2F—Depicts the log-in screen of the mobile application for Anonymous Alerts where a Submitter enters a unique Code Identifier "UCI" and password to activate Community View and submit anonymous messages to authorized Receiver(s)/Recipient(s). The Unique Code Identifier "UCI" functions for use in identifying the community and acts as a location finder to quickly identify which community the anonymous submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified and authorized Receiver(s) or Receiver group(s). The UCI can determine or establish the permissions for locating a specific community and its location.

FIG. 2G shows the Submitter message submission screen wherein the Submitter chooses to select "Send Incident Report" or "Glossary" to access definition of terms or "Help".

FIG. 2H shows the Submitter message submission screen after the Submitter chooses to select "Send Incident Report" which includes several entry fields, message field, and submit or send button.

FIG. 2I shows the Submitter message submission screen after the Submitter chooses to select "Send Incident Report" which includes several entry fields and Submitter can select location with a picker that is data driven with custom locations.

FIG. 2J shows the Submitter message submission screen after the Submitter chooses to select "Send Incident Report" which includes several entry fields including an anonymous message screen.

FIGS. 2K and 2L show how the Submitter is prompted to upload an image (upload, or take picture then upload) at the Submitter's discretion if the Submitter has an image to upload about an incident report or other message/information. Various choice options are shown.

FIG. 2M shows a confirmation screen showing that image or other content has been successfully uploaded.

FIGS. 2N and 2O show Mobile Application Screens, sending at least one unique identifier and at least one confirmation message to at least one submitter, and sending at least one unique identifier, and any non-encrypted information to at least one receiver. The submitter can choose to remain anonymous, send the anonymous e-mail address and/or text number in the entry field in the confirmation message, then submit this information to be encrypted and stored.

Alternatively, the submitter can choose to be non-anonymous, and reveal information such as the Submitter's name, e-mail address, phone number, phone text number or network identity code or location for non-anonymous communications.

FIG. 2P depicts a "Glossary of Terms" screen. This can include community-specific customized terms.

FIG. 2Q shows the screen for "Definition of Terms" in the drop down menus.

FIG. 2R shows a help screen on mobile device.

FIG. 2S shows a screen shot of Receiver's smart phone device depicting a message being received from an anonymous Submitter.

After activating an icon on at least one of a computer, mobile device, smart device, or tablet the Submitter enters in a login screen of the application, information including a unique code identifier "UCI". The Unique Code Identifier "UCI" functions for use in identifying the community and acts as a location finder to quickly identify which community the anonymous submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified and authorized Receiver(s) or Receiver group(s). The UCI can determine or establish the permissions for locating a specific community and its location.

As shown in FIG. 3, once a Message Submitter has submitted an alert via the "1-Step Submit" 57 process shown in FIG. 2, the Submitter will receive a notification note and confirmation 60 from the system 37. The system 37 will also generate a unique identifier 63 as depicted by the screenshot in FIG. 15 (the current preferred mode is 5 digits, but any number of digits, letters, symbols or combinations thereof can be used). This unique identifier can be used when contacting the school via telephone or any other transmission method in order to reference the message that was submitted without revealing the Submitter's identity. The system will also permit the Message Submitter to provide an e-mail to which the school may choose to reply 66. The system will automatically encrypt the e-mail address submitted to the school in order to maintain the Submitter's anonymity. Should the Message Submitter elect to be non-anonymous and provide an e-mail and/or other details, the Submitter simply enters the address and/or other information in the non-anonymous section and clicks "submit" 69. The system can guarantee no IP (internet protocol) address tracking for additional security for a group or community that chooses or prefers the highest level of anonymous protection or the method can provide IP addresses as part of the process or when a direct threat has been launched through the system 37. The system 37 can guarantee no IP (internet protocol) address and no VoIP (Voice over Internet Protocol) tracking for additional security for a group or community that chooses or prefers the highest level of anonymous protection or the method can provide IP and/or VoIP addresses as part of the process or when a direct threat has been launched through the system.

Figure 7:
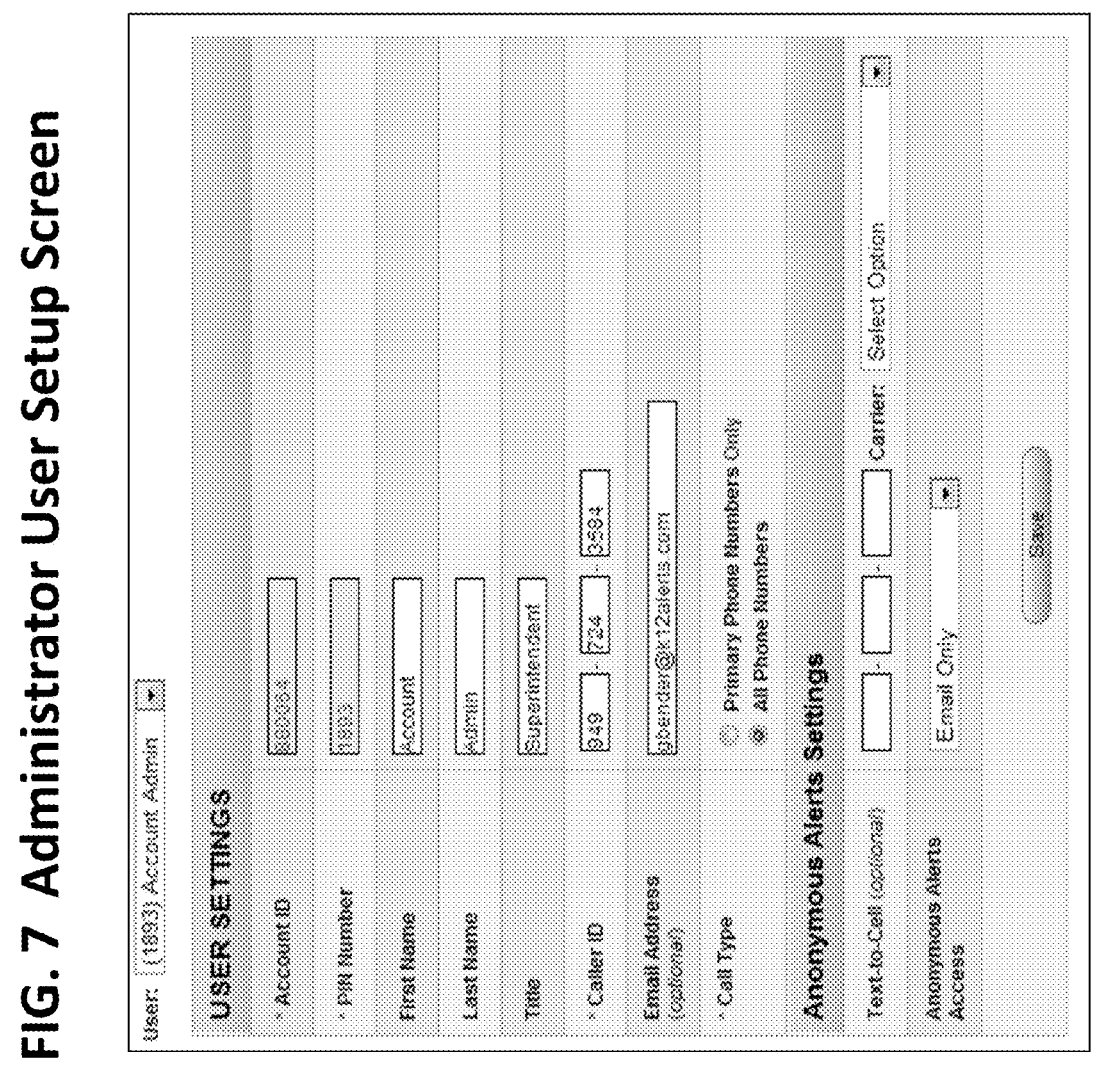

As described in FIG. 4 and depicted in the screenshot of FIG. 7, a system administrator (admin) 550 must first create an account for a content Message Recipient (i.e., receiver/Authorized party). Thus, the admin 550 must first log into the system to access the admin's account, such access to the admin's account can be through use of a mobile or other smart device application by selecting the icon located on the mobile and/or smart device, or login screen 72, or can be through any of a computer, smartphone, mobile phone, mobile device, Internet accessible device.

To create a new account, an admin 550 selects the "Account" option on the menu bar 75 and fills in the requisite information, comprising first and last name of the new user 78, may enter title, the type of notification the admin 550 may wish to receive from the system 37 (e-mail, text, voice, instant message, reports only, social media notification or all) 81, and the new user's corresponding contact information including e-mail addresses, and any relevant phone numbers 84. Once an account has been created, a Message Recipient (Receiver) can access anonymous/non-anonymous alert messages by logging into the system Account 87 as described in FIG. 5. From here, the user can run a query for anonymous/non-anonymous alerts from the Campaign Track or reporting system on a menu 90, and identify a date range, and message type 93. The system will run the query 96 and the Recipient/admin 550 user can select to either 1) Open message, 2) Reply to message, 3) Forward message, or 4) Delete message, all options depicted in 99. Should the user choose to open a new message 108 as shown in FIG. 6A, the user will be able to access that particular message, as well as view its message history with time stamped information 102, as depicted in FIG. 6A. The receiver may also elect to forward a message via e-mail to another party 105 before or after opening the message. Should the Receiver choose to reply to a message 111, the system 37 will open a new window 114 and permit a response to the Submitter. The response is then submitted through a "1-Step Submit" or "Submit" (one-click submit) process 117. The method and system of the invention thus allows for an unlimited number of recipients/Receivers to instantly receive information on mood related, time sensitive or secretive, medical, and/or threatening issues.

Figure 10:
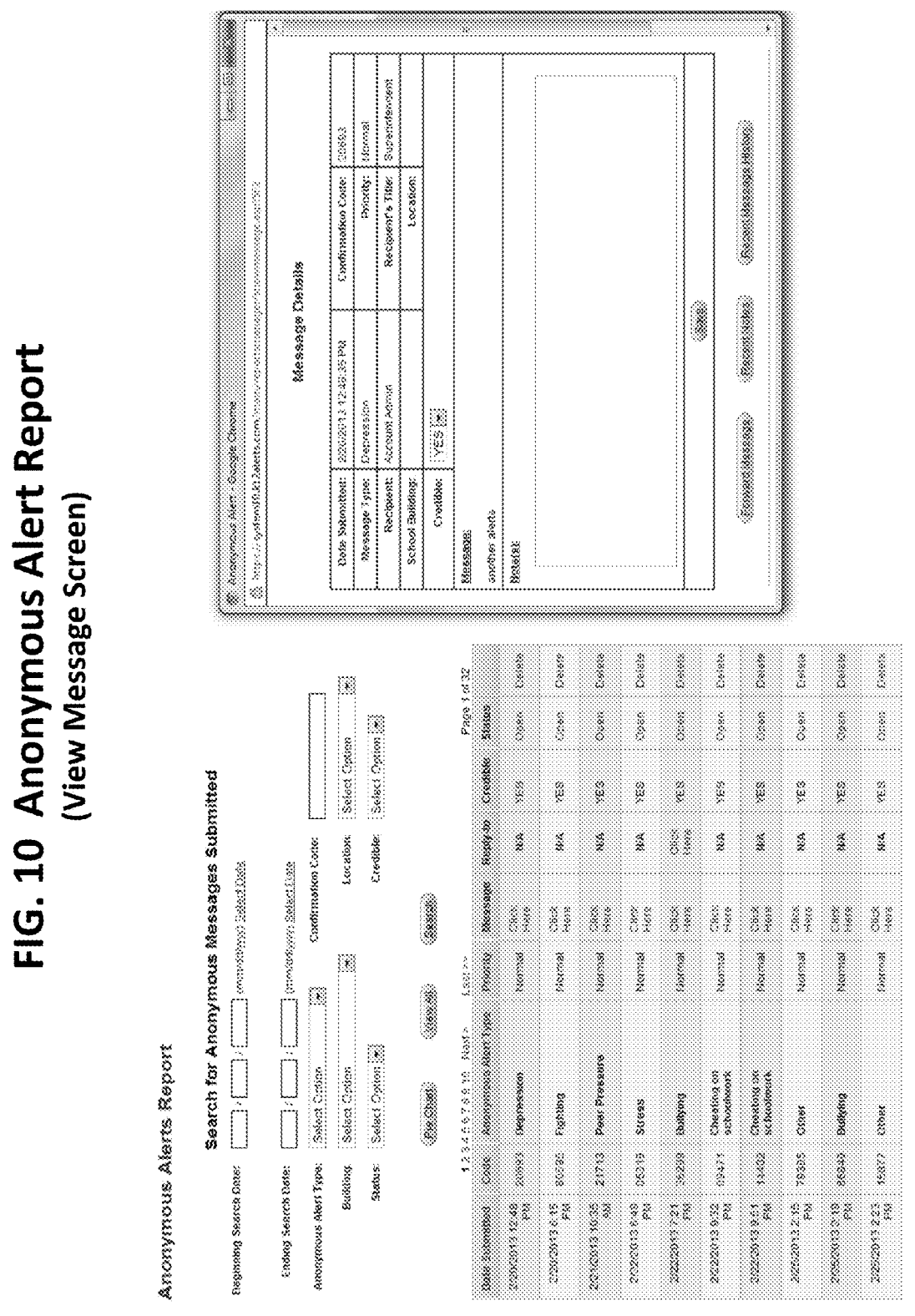

Referring to FIGS. 8-11, a Receiver who would like to view message content of various types, or those submitted during a particular time period, may do so through the system's 37 search options. FIG. 8 shows both the system's 37 date limitation options for a search query, as well as its options to refine a search by content message type through category selections available in the drop-down list provided. Once a query has yielded a set of results, (see FIG. 9) a user may select any particular message and its history and either read, reply, delete, or forward the information to another party. The results can also be displayed in a graphical pie chart format. FIG. 10 is a screenshot of a message screen containing an original message, related message history, and reply/forwarding options by an administrative user. FIG. 11 is a screenshot of a reply screen for an administrative user.

Figure 12:
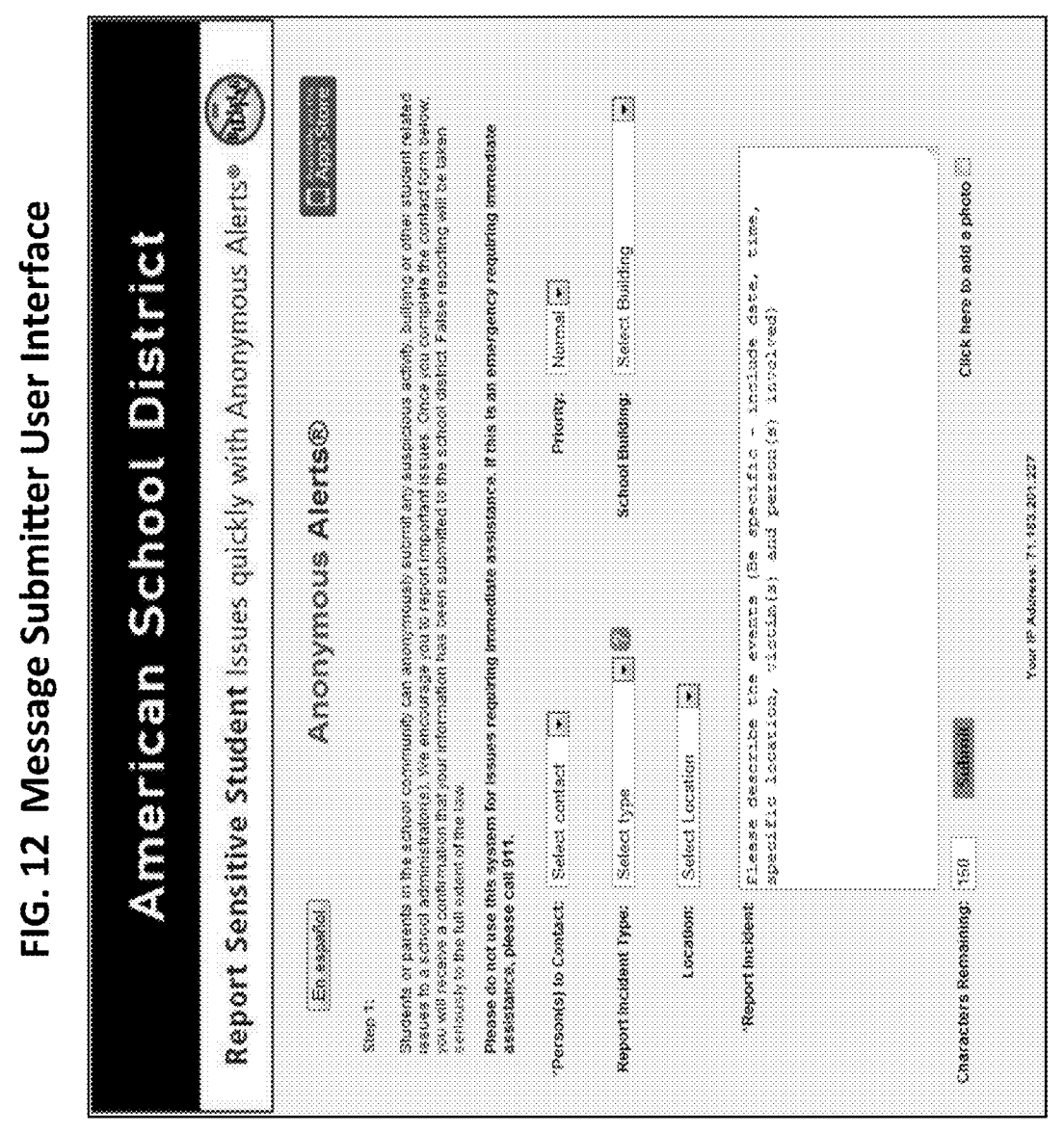
Figure 14:
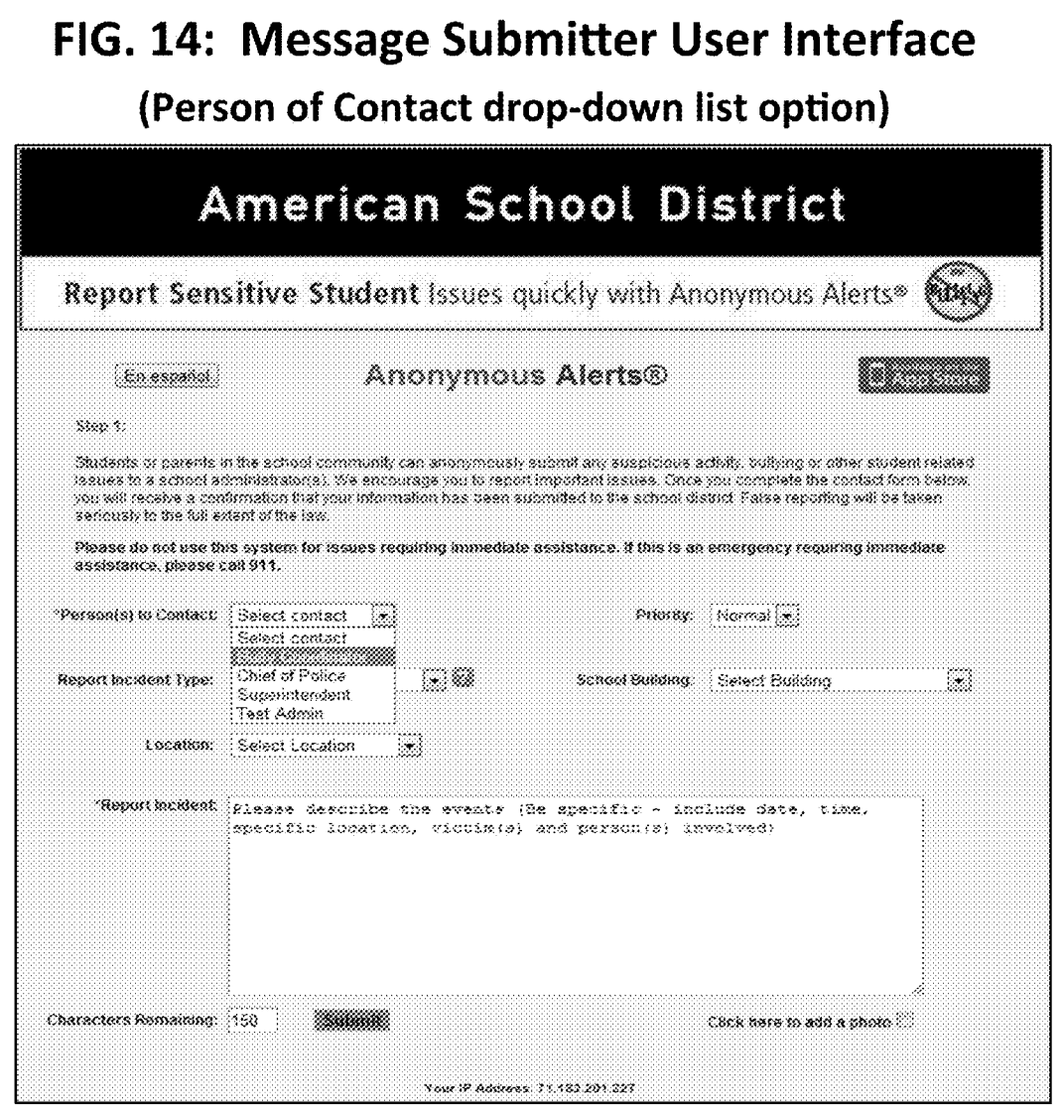

To submit a new anonymous/non-anonymous alert, a Message Submitter (or Submitter) must do so through the user interface or mobile application used in connection with the user interface. The template, as depicted in FIG. 12, has been simplified to include two required fields from drop-down lists: the Person of Contact field (FIG. 14), and the Message Type field (FIG. 13). The third field provides space for the body of the message. A character count is provided in the lower left hand corner of the template to increase the ease of use of the template. Once a message alert has been successfully submitted, the Submitter will automatically receive a notice confirming the submission. As depicted in FIG. 15, the confirmation notice includes an anonymous ID number as well as a corresponding telephone number should the Submitter wish to follow up on the Submitter's submission. Should the Submitter seek a response, the Submitter may also elect to provide an e-mail address or text number, which can be automatically encrypted by the system 37 in order to maintain the Submitter's anonymity, if desired.

FIG. 16 depicts an example of a mobile or smart phone screen having a downloaded application of the system and method of the invention.

Figure 17:
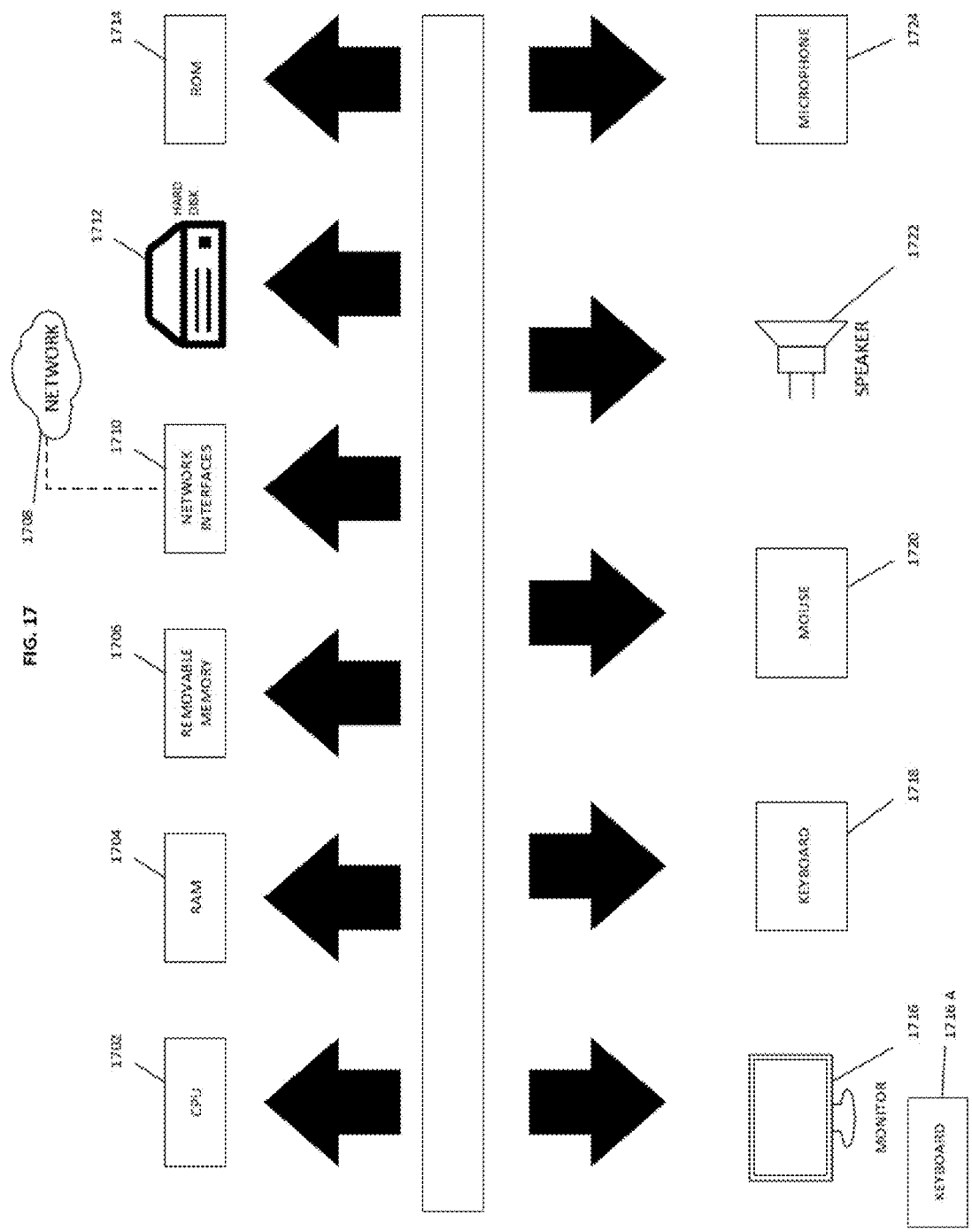
FIG. 17 is an exemplary information handling system in accordance with an embodiment of the present invention.

FIG. 17 depicts an illustrated a block diagram of an exemplary information handling system. The information handling system comprises a bus that connects (either directly, or in combination with another bus) a Central Processing Unit (CPU, or processor) 1702 to RAM 1704, hard disc 1712, ROM 1714, and input/output devices. Additionally, the bus can have an interface for receiving removable memory 1706. Removable memory can include but is not limited to an optical disc, a memory card, or a "boot" drive. Additionally, the bus can connect the CPU 1702 to network interface(s) 1710. The network interface(s) 1710 can either physically or wirelessly connect the information handling system to one or more networks 1708, such as, but not limited to, the internet, WAN, and/or LAN, the Public System Telephone Network, a cellular telephone network, or a cellular data network.

Some inputs can include a mouse 1720, a keyboard 1718, and a microphone 1724. The output devices can include a screen 1716 and speaker(s) 1722. In certain embodiments, the screen 1716 can be heat or touch sensitive so as to project a visual keyboard 1716A for receiving inputs, thus not requiring a keyboard 1718 or mouse 1720.

According to certain embodiments of the present invention, the invention incorporates a plurality of instructions that are executable by the CPU 1702, residing in any combination of RAM 1704, Removable Memory 1706, hard disc 1712, or ROM 1714. Additionally, the instructions can reside at a node on the network. It will be understood that storage of said instructions in the node, RAM 1704, Removable Memory 1706, hard disc 1712, or ROM 1714 changes the foregoing, chemically, electrically, and/or electromagnetically.

Figure 18:
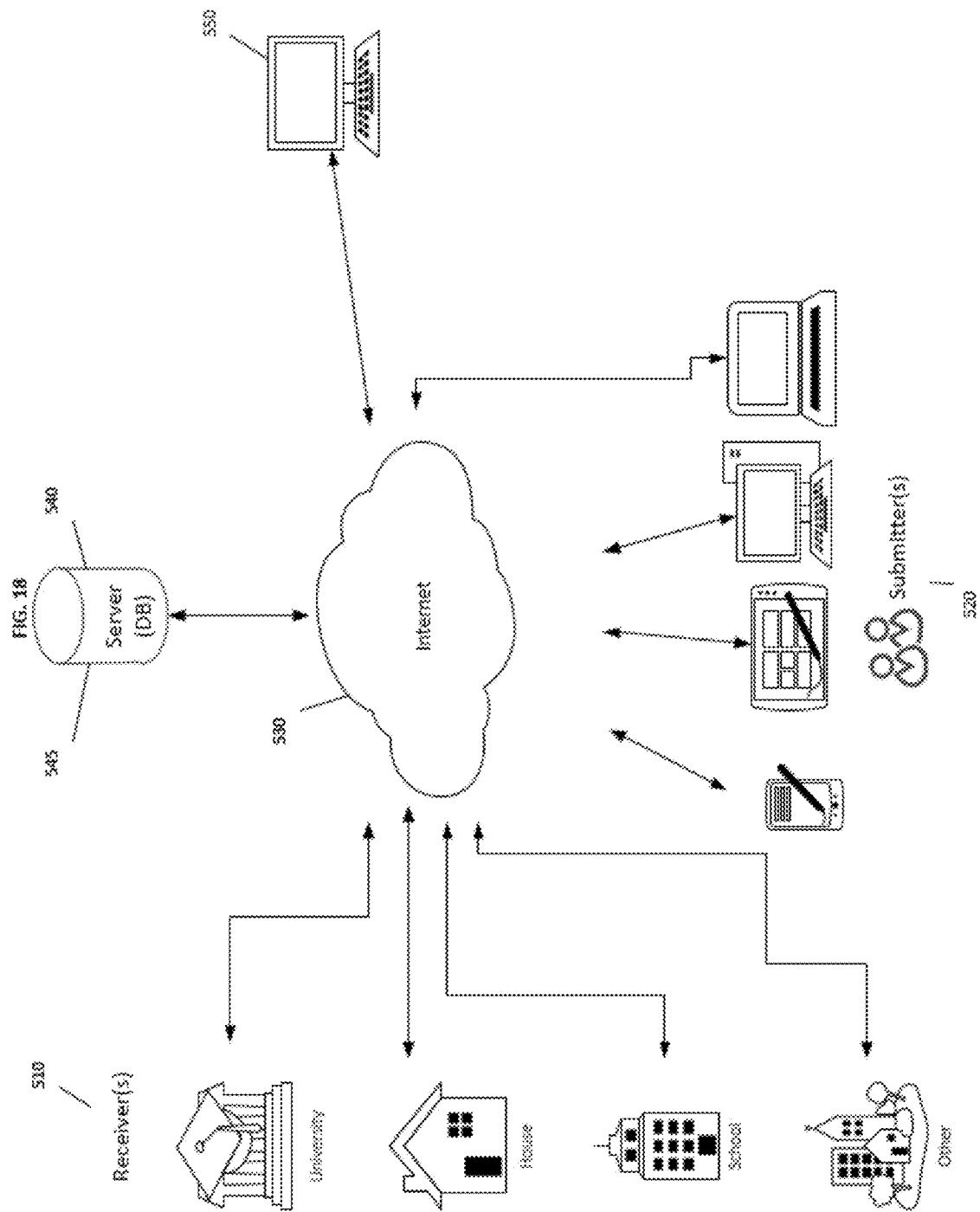
FIG. 18 depicts some of the Submitter and Receiver elements comprised in an embodiment of the present invention.

FIG. 18 depicts a typical system 37 enabling bi-directional connection via the cloud 530 (and 39) (which can be comprised of one of more of the following: the internet, a virtual network, social network, world wide web, WAN, and/or LAN) of a collection of Submitters 520 using devices such as a smart phone, tablet, computer, and laptop with a collection of Receivers 510 who are authorized persons located in places such as universities, houses, schools, and other places, and their bi-directional communication is enabled by at least one server 15 (and 540) housed in the host system for storing information in a data base 545 such as data identity, unique identifiers and other information used by the system administrator 550 as might be implemented in the present invention.

Figure 19:
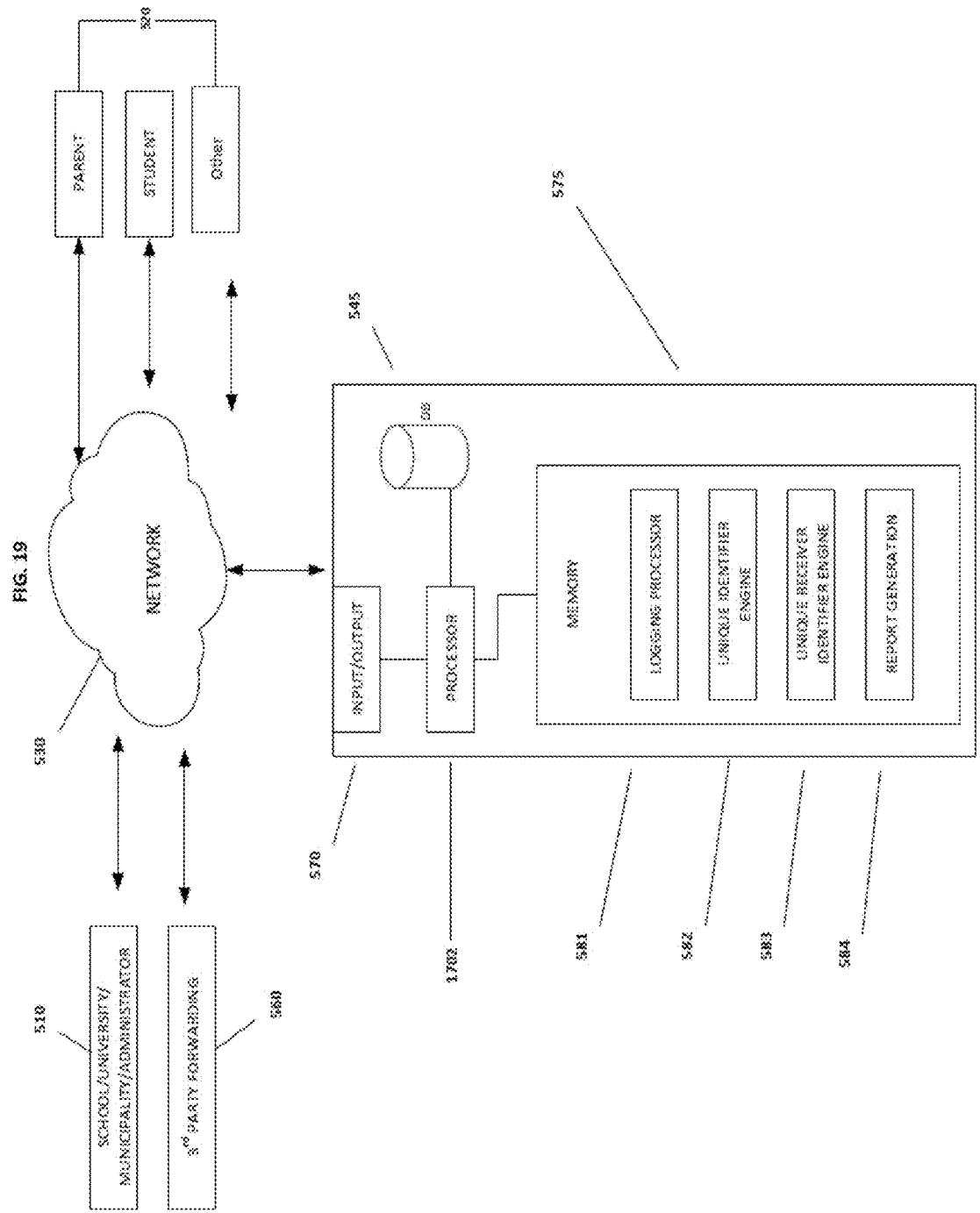
FIG. 19 is a system view showing the relationship between Submitter(s) and Receiver(s) and the intervening hardware, further depicting some of the steps performed in an embodiment of the present invention.

FIG. 19 is a system view showing the relationship within a cloud 530 (and 39) (which can be comprised of one of more of the following: the internet, a virtual network, social network, world wide web, WAN, and/or LAN) between Submitter(s) 520 which could consist of a parent 3, student 1, or other 7 and Receiver(s) 510 which could consist of a school, university, municipality, administrator, or 3rd party forwarding 560. In the server 15 (and 540) is depicted the input/output devices 570, processor 1702, data base 545, and collective memory 575 in which runs the logging processor 581, unique identifier engine 582, unique receiver identifier engine 583, and report generation 584. The logging processor 581 is unique login software that works in connection with the input devices and interfaces to set up communication between Receivers, Submitters, third parties, and administrators. The unique identifier engine 582 is unique software that generates Unique Identifier(s) using unique algorithms. The unique receiver identifier engine 583 utilizes unique software to generate a Receiver Unique Identifier. The report generator 584 is unique software designed to create unique reporting, charts, tables, lists, statistics, and/or data compilations about alerts and other information received and generated.

It is noted that community members can quickly submit content and information through a variety of transmission options (i.e., computer, fax, phone, smartphone, mobile phone, mobile device, smart device, Internet accessible device) to identified and selected parties who are authorized to respond and confront the issue(s) presented by the sensitive content of the message.

The content selection screen is divided into fast and easy sections comprising person of contact, message priority, message type and message. Additionally, submission is advantageously reduced to a simplified, one-step process that creates ease of use for the members of the community for their submission of quick, immediate, and actionable content and code(s). The system can generate immediate feedback once a submission has been successfully sent, providing a code number identifying the particular claim(s) for reference purposes without compromising the anonymity of the Message Submitter. Encryption of the Sender ID can create a level of comfort in the anonymity it offers community members, students, parents, staff, and various community-member users. The content submitter can then choose to reveal their identity anytime thereafter. Additionally, the authorized Receiver(s) of the anonymous messages can have the option to furnish the individual Submitter with a response(s), forward the information to additional parties, and/or forward the information to subject matter experts.

The member transmission option can be to a download smart device application set to receive a particular group code which can insure the submitted content and information is routed to the selected group authorized and designated responder(s).

Additionally, the system can guarantee no IP tracking for additional security for a group or community that chooses or prefers the highest level of anonymous protection, or the method can provide IP addresses as part of the process or when a direct threat has been launched through the system.

Prior to sending an anonymous communication from at least one Submitter, Submitter may activate an icon on at least one of a computer, mobile device, smart device, or tablet. The Submitter can enter in log in screen of the application, information including a unique code identifier. After activating an icon on at least one of a computer, mobile device, smart device, or tablet, the Submitter can enter in a login screen of the application, information including a unique code identifier "UCI". The Unique Code Identifier "UCI" functions for use in identifying the community and act as a location finder to quickly identify which community the anonymous Submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified authorized Receiver(s) or Receiver group(s). The UCI can determine or establish the permissions for locating a specific community and its location.

Submitter can utilize the activated application to send, mood related, time sensitive, or secretive information, sending an anonymous communication, said anonymous communication containing information, encrypting the information, in part or in whole, routing the encrypted information and any other information to be sent to at least one Receiver, generating at least one unique identifier, and sending at least one unique identifier and at least one confirmation message to at least one submitter, and sending at least one unique identifier, and any non-encrypted information to at least one receiver. Submitter can receive a selection command from the Submitter/user, and said Submitter/user can type in a message and/or select a photo/image/sound or video to upload to the system receiving a unique identifier with message confirmation.

The Submitter can receive a selection command from the Submitter/user by clicking on an icon, and this icon appears on a user screen and enables the Submitter/user to type in a message and/or select a photo/image/sound or video to upload to the system receiving a unique identifier with message confirmation.

The user screen can be a mobile user device. The invention can include a data server, wherein an icon enables communication between a Submitter message and the data server using a unique identifier, and Submitter can be using a search module which is capable of searching the database.

FIG. 20—Depicted by FIG. 20, A Mobile to Mobile Message Sending and Receiving—The system includes a server 15 (and 540), that is accessible by Submitter(s) comprising of at least one student(s) 1, parent(s) 3, staff/authorized parties 6, residents/community members 9 of the community, and/or other Submitter(s) 7 via a network that is connected to the Internet, world wide web, any virtual network, a WAN (wide-area network), and/or LAN (local-area network). The server 15 (and 540) is connected to at least one of the databases 18, in conjunction with 21, which uniquely identifies content, messages, identity information, and information/content data 12 and matches the submission to the authorized receiving party(s) designated to receive the submission. The database 18 enables encryption of the identity and/or content data and generates a Content Unique Identifier 22 for the Submitter identifying content so that it is anonymously sent to the intended recipient(s). The system 37 is anchored through the Internet, a virtual network, WAN and/or LAN and is, thus, accessible by PDA, tablet, smartphone, mobile device, or other device with Internet, virtual network, WAN, and/or LAN connectivity.

Also via the Internet, a virtual network, WAN, and/or LAN by authorized person(s)/receiver(s) such as school superintendent 27, principal 30, counselor 33, law enforcement official(s) 36, and/or other receiver(s) 34. Because of the inventive network's use of the Internet, a virtual network, WAN, and/or LAN, this information is accessible to administrators via PDA, mobile device, smart phone, tablet, or other mobile device with Internet, a virtual network, WAN, and/or LAN connectivity. As a result of this accessibility, school administrators and other personnel are able to access messages, by log-in using Receiver Unique Identifier 20 which is verified by Host Administration Device 21, to which they are an intended recipient, and communicate with the submitting party, or forward the received message to other parties via e-mail, text, and/or other communication methods.

While the instant invention has been shown and described in accordance with preferred and practical embodiments thereof, it is recognized that departures from the instant disclosure are contemplated within the spirit and scope of the present invention. Therefore, the true scope of the invention should not be limited since other modifications will become apparent to those skilled in the art upon a study of the claims, drawings, descriptions, explanations, and specifications herein.

ANONYMOUS ALERTS FIGURE COMPONENT DESIGNATIONS

FIG. 1 System Flow
1 Student
3 Parent
6 Staff/Authorized Parties
7 Other Submitter(s)
9 Resident/Community Member
12 Information/Content
15 and 540 Server
18 Data Base, includes Content Data 19+Receiver Unique Identifier 20
19 Content Data
20 Receiver Unique Identifier
21 Content Unique Identifier 22+Receiver Unique Identifier 20
22 Content Unique Identifier
24 Receiver Unique Identifier 20+Geographic Code ID 203
27 Superintendent
30 Principal
33 Counselor
34 Other Receiver(s)
36 Law Enforcement
37 System
203 Geographic Code ID
FIG. 2 Message Submitter Screen 1
39 and 530 Cloud (includes one or more of the following: Internet, a virtual network, social network, world wide web, WAN, and/or LAN)
42 Message Window
43 Translation
44 School Building
45 Person(s) to Contact
48 Priority
51 Incident Type
52 Locations
53 Download iPhone App
54 Message
56 Add photo/image/video/sound
57 "1-Step Submit" or "Submit"
FIG. 2A Choose an Image
59 Upload
64 Choose File or Cancel
FIG. 2B Selecting the image
68 Open
FIG. 2C Uploading the image
FIG. 2D Crop the image
61 Submit/Cancel
67 Crop
FIG. 2E Mobile Application Screen 1
FIG. 2F Mobile Application Screen 2
FIG. 2G Mobile Application Screen 3
FIG. 2H Mobile Application Screen 4
FIG. 2I Mobile Application Screen 5
FIG. 2J Mobile Application Screen 6
FIG. 2K Mobile Application Screen 7
FIG. 2L Mobile Application Screen 8
FIG. 2M Mobile Application Screen 9
FIG. 2N Mobile Application Screen 10
FIG. 2O Mobile Application Screen 11
FIG. 2P Mobile Application Screen 12
FIG. 2Q Mobile Application Screen 13
FIG. 2R Mobile Application Screen 14
FIG. 2S Mobile Application Screen 15
FIG. 3 Message Submitter Screen 2
60 Message submitter (anonymous identity) receives a unique identifier and confirmation from system
63 Message submitter receives a unique identifier to contact the school about message without providing identity
66 Message submitter has option to provide an e-mail address and/or other information that submitter decides to encrypt or not
69 Message submitter enters e-mail and/or other information and clicks SUBMIT
FIG. 4 Administrator User Account Setup Process of a Message Recipient
72 Admin Logs in to System Account
75 Admin clicks Account on Menu bar
78 Admin enters the new user's: name/title
81 Admin determines type of notification person will receive
84 Admin enters the new user's: E-mail address/Text to Cell number/Phone Number
FIG. 5 Message Receiver/Message Recipient accessing Messages from Admin Interface
87 logs in
90 selects Anonymous Alerts from Campaign Track or reporting system
93 Data Range/Message Type
96 System runs Query
99 chooses message option
FIG. 6A 108 Message Receiver/Message Recipient OPTION 1 OPEN NEW MESSAGE PROCESS
102 View message history with timestamp
105 Forward message via e-mail to another person
FIG. 6B 111 Message Receiver/Message Recipient OPTION 2 REPLY TO MESSAGE PROCESS
114 System opens new window with text box
117 clicks "1-Step Submit" or "Submit"
FIG. 7 Administrator User Setup Screen FIG. 8 Anonymous Alert Report (search options)
FIG. 9 Anonymous Alert Report (System Query Results)
FIG. 10 Anonymous Alert Report (View Message Screen)
FIG. 11 Anonymous Alert Report (Administrator Reply Screen)
FIG. 12 Message Submitter User Interface
FIG. 13 Message Submitter User Interface (Report Incident Type drop-down list option)
FIG. 14 Message Submitter User Interface (Person of Contact drop-down list option)
FIG. 15 Message Submitter User Interface (Confirmation that message was received)
FIG. 16 Step 3
FIG. 17
1702 CPU (Processor)
1704 Ram
1706 Removable memory
1708 (more networks) network
1710 Network interfaces
1712 Hard disk
1714 Rom
1716 Screen
1716A visual keyboard
1718 Keyboard
1720 Mouse
1722 Speakers
1724 Microphone
FIG. 18
510 Receiver(s)
520 Submitter(s)
530 and 39 Cloud (includes one or more of the following: Internet, a virtual network, social network, world wide web, WAN, and/or LAN)
540 and 15 Server
545 data Base
550 System Administrator
FIG. 19
510 Receiver(s)
520 Submitter(s)
530 and 39 Cloud (includes one or more of the following: Internet, a virtual network, social network, world wide web, WAN, and/or LAN)
545 Data Base
560 3RD Party Forwarding
570 Input Output Devices
575 Collective Memory
581 Logging Processor
582 Unique Identifier Engine
583 Unique Receiver Identifier Engine
584 Report Generator
1702 CPU (Processor)

DEFINITIONS

These definitions are in addition to the words and phrases specifically defined in the body of this application.

Anonymous Alerts: is a registered trademark of Message Logix, Inc., having US Trademark Registration No. 4,306994.

Device: Comprises at least one of electronic device, computer, mobile device, digital scanner, image scanner, scanner, handheld device, reader device, or server.

Digital Scanner, Image Scanner: an electronic device that generates a digital representation of an image for data input to a computer.

Electronic Device: a device that accomplishes its purpose electronically.

Hand-held computing device: a device that can have an operating system (OS), and usually can run various types of application software, known as apps. Most hand held devices can also be equipped with WI-FI, Bluetooth and GPS capabilities that can allow connections to the Internet and other Bluetooth capable devices such as an automobile or a microphone headset. A camera and/or media player feature for video or music files can also be typically found on these devices along with a stable battery power source. Other types of Mobile Devices include tablet computers. As in a personal digital assistant ("PDA"), the input and output are often combined into a touch-screen interface, Smartphones and PDAs Enterprise Digital Assistants may offer integrated data capture devices like barcode, RFID, optical, Optical Character Recognition, and smart card readers.

Internet: includes generically/commonly known internet networks, virtual networks, wide area networks (WAN) and local area networks (LAN).

Message or communication: a generic term used to refer to a communication whether it be made in writing, by voice, by image (photo, picture, etc.) or otherwise, or in any combination thereof.

Mobile Device: is a generic term used to refer to a variety of devices that allow people to access data and information. A Mobile Device (can also be known as a handheld computing device, handheld device, handheld computer or simply handheld) can also be a hand-held computing device, which can have a display screen and can also have a touch input and/or a miniature keyboard.

User Interface: is the means by which a user can communicate with the system and method of the invention, e.g., a computer, fax, voice prompt, key board, touch pad, phone, mobile device and/or smart device.

Virtual: occurring, relating to, or existing within a virtual reality or for all practical purposes an existence which is possible or inferred.

Unique Identifier: a unique code identifying person(s) and/or group(s) generated through software combined with at least one unique algorithm.

Receiver's Unique Identifier: a unique code identifying receiver(s) (and not Submitter(s)) generated through software combined with at least one unique algorithm.

Host System Administration Device: (located at system host's location) The master system communicating with all central and local systems.

Authorized Person: Any designated person possessing authority to instantiate action based upon data supplied by a Submitter.

Unidentified Submitter: a Submitter who does not wishing to remain anonymous.

Virtual Network: a network occurring, relating to, or existing within a virtual reality Social Network: a private and/or website or network that enables the connection of any number of users for any number of purposes LAN: local area networks (LAN).

WAN: wide area networks (WAN).

System Administration Device: (located at client's location) the input device used by the system administrator at any venue or locality.

information/submission from Submitter: information and/or a submission that can then be responded to and/or acted upon.

Submitter: a person who and/or group that submits information.

Sender: a Submitter

Receiver: a person who and/or group that receives information.

Although preferred embodiments of the present invention have been described it will be understood by those skilled in the art that the present invention should not be limited to the described preferred embodiments. Rather, various changes and modifications can be made within the spirit and scope of the present invention.

What is claimed is:

1. A method for at least one submitter to communicate information comprising:
   sending an anonymous communication from the at least one submitter, from at least one user-interface of at least one input device, connected to at least one of the internet, a virtual network, a communication network, social network, world wide web, WAN, and/or LAN, wherein said anonymous communication contains information;
   encrypting the information, in part or in whole;
   submitting the encrypted information and any other information to be sent to at least one receiver, wherein at least one of the at least one receiver(s) is a targeted receiver for the communication;
   generating at least one unique identifier associated with the submitted information, in part or in whole;
   sending the at least one unique identifier and at least one confirmation message to the at least one submitter;
   sending the at least one unique identifier, and any non-encrypted information or message to the at least one receiver;
   choosing by the submitter to be identified as being non-anonymous, by submitting submitter related information, comprising their name, e-mail address, phone number, phone text number, network identity code, or location for non-anonymous communications to the at least one receiver(s), wherein the submitter related information is stored in at least one database to be associated with the unique identifier;
   matching the targeted receiver to a specific communication and information targeted by the submitter associated to the at least one unique identifier stored in the database;
   providing a Receiver Unique Identifier to a host system administration device, system administration device and to the targeted receiver;
   granting the targeted receiver access to secure communication and information targeted by the submitter for the targeted receiver once the inputted Receiver Unique Identifier is verified;
   wherein the targeted receiver is permitted to open communication(s), read the communication(s), act on the communication(s), forward the communication(s), respond to the communication(s), reply to the communication(s), and/or delete the communication(s) based on the inputted Receiver Unique Identifier.

2. A method for at least one submitter to communicate information comprising:
   sending an anonymous communication from the at least one submitter, from at least one user-interface of at least one input device, connected to at least one of the Internet, a virtual network, a communication network, social network, world wide web, WAN, and/or LAN, wherein said anonymous communication contains information;
   encrypting the information, in part or in whole;
   submitting the encrypted information and any other information to be sent to at least one receiver of a plurality of receivers, wherein the at least one receiver of the plurality of receivers is a targeted receiver for the communication;
   generating at least one unique identifier associated with the submitted information, in part or in whole;
   sending the at least one unique identifier and at least one confirmation message to the at least one submitter;
   sending the at least one unique identifier and any non-encrypted information or message to the at least one receiver of the plurality of receivers;
   matching the targeted receiver to a specific communication and information targeted by the submitter associated to the at least one unique identifier stored in the database;
   providing a Receiver Unique Identifier to a host system administration device, system administration device, and to the targeted receiver;
   granting the targeted receiver access to secure communication and information targeted by the submitter for the targeted receiver once the inputted Receiver Unique Identifier is verified;
   wherein the targeted receiver is permitted to open communication(s), read the communication(s), act on the communication(s), forward the communication(s), respond to the communication(s), reply to the communication(s), and/or delete the communication(s) based on the inputted Receiver Unique Identifier.

3. A method for at least one submitter to communicate information comprising:
   sending an anonymous communication from the at least one submitter, from at least one user-interface of at least one input device, connected to at least one of the Internet, a virtual network, a communication network, social network, world wide web, WAN, and/or LAN, wherein said anonymous communication contains information, wherein the anonymous communication sent from the at least one submitter is inputted utilizing at least one customized standardized template with a drop-down list for selecting at least one recipient,
   encrypting the information, in part or in whole;
   receiving, by the input device a selection of the at least one recipient from the drop-down list within the standardized template;
   transmitting, by the input device, the anonymous communication to the selected at least one recipients;
   submitting the encrypted information and any other information to be sent to at least one receiver of a plurality of receivers, wherein the at least one receiver of the plurality of receivers is a targeted receiver for the communication;
   generating at least one unique identifier associated with the submitted information, in part or in whole;
   sending the at least one unique identifier and at least one confirmation message to the at least one submitter;
   sending the at least one unique identifier and any non-encrypted information or message to the at least one receiver of the plurality of receivers; and
   matching the targeted receiver to a specific communication and information targeted by the submitter associated to at least one unique identifier stored in the database;
   providing a Receiver Unique Identifier to a host system administration device, system administration device and to the targeted receiver;
   granting the targeted receiver access to secure communication and information targeted by the submitter for the targeted receiver once the inputted Receiver Unique Identifier is verified;
   wherein the targeted receiver is permitted to open communication(s), read the communication(s), act on the communication(s), forward the communication(s), respond to the communication(s), reply to the communication (s), and/or delete the communication(s) based on the inputted Receiver Unique Identifier.

4. The method of claim 3, wherein the customized standardized template drop-down list comprises at least one of the following: recipient, priority level, type of incident, building, location, or other.

5. The method of claim 3, wherein the customized standardized template includes a choice for setting the level of priority that can be assigned to the communication, the level is one of "Urgent", "High", "Medium", "Normal", "Low".

6. The method of claim 3, wherein the standardized template includes a drop-down list for selecting a type of communication, said types of communication comprising of at least one of stress, family, issues, harassment, stealing, drugs, bullying, weapons on campus, bomb threats, cheating on schoolwork, cutting/self-injury, cyber bullying, fighting, gang related issues and/or associations, peer pressure, sexual harassment, and/or depression or other customized type of communication.

7. The method of claim 3 wherein the standardized template includes a drop-down list for selecting a types of location, said types of location comprising bus, cafeteria/lunchroom, classroom, hallway, auditorium, gymnasium, locker room, street, sidewalk, playground, bathroom, in town, sports field, Face book, instant messaging, face time, social media, imessage, e-mail, instant message, Twitter, telephone, Skype, IP (internet protocol) address, VoIP (Voice over Internet Protocol), a multimedia message (MMS), YouTube or other customized type of location.

8. The method of claim 3 wherein the communication language can be selected by the submitter from a choice of, or drop down window displaying, a selection of a variety of languages to pick from to read and/or communicate in.

9. The method of claim 1, wherein the at least one submitter may submit an non-anonymous message to at least one receiver(s) on at least one of a mobile device, mobile phone, computer, smart pad, electronic device, input device, communication device, fax, facsimile machine, phone, voice prompt, tablet, and/or smart device.

10. The method of claim 1, further comprising the steps of:
    (g) prior to sending an anonymous communication from the at least one submitter, activating an icon on at least one of a computer, mobile device, Mobil phone, smart pad, electronic device, input device, communication device, touchscreen computing device, portable media player, smart device, or tablet to provide an activated application and open a log-in screen;
    (h) inputting a unique code identifier "UCI" on the log-in screen wherein the unique code identifier "UCI" identifies which community the anonymous submitter(s) wants to communicate with or is located in or near; and
    (i) submitting the UCI to authorized person(s) and/or administrator(s) to disseminate the UCI with-in the community and surrounding areas so the UCI can be utilized by submitter person(s) and/or groups(s) in or near the community for sending anonymous communications to a specified authorized receiver(s) or receiver group(s).

11. The method of claim 1, wherein the at least one of a user-interface and/or a input device is comprised of a mobile device, tablet, smart device, smartphone, mobile phone, computer, voice prompt, phone, fax, facsimile, a part therein and/or associated software, further comprising the steps of:
    (g) locating the submitter(s) using a geographic locater, and/or global positioning system (GPS); and
    (h) providing the submitter's location to a host system for submission to receiver(s).

12. The method of claim 11, wherein the geographic locater is sending and/or transmitting to/from the submitter's, receiver's, and/or the administrator's mobile device.

13. The method of claim 1, further comprising the steps of:
    (g) utilizing the activated application to send, mood related, time sensitive, or secretive information, sending an anonymous communication, said anonymous communication containing information;
    (h) encrypting the information, in part or in whole;
    (i) routing the encrypted information and any other information to be sent to at least one receiver;
    (j) generating at least one unique identifier; and
    (k) sending the at least one unique identifier and at least one confirmation message to the at least one submitter, and sending the at least one unique identifier, and any non-encrypted information to the at least one receiver.

14. The method of claim 1, further comprising the steps of:
    (g) the system receiving at least one selection command from the submitter;
    (h) the submitter typing in a message/information and/or selecting a photo/camera function/image/text/film/audio/file/content/sound or video to upload to the system; and
    (i) the submitter, after sending a submission/communication, receiving a communication comprising a unique identifier and a message confirmation.

15. A non-transitory storage device storing a plurality of instructions for at least one message submitter to send, in one-click, mood related, time sensitive, medical, threatening, or secretive information, wherein said non-transitory storage device comprises a plurality of instructions for:
    sending an anonymous communication from the at least one submitter, from at least one user-interface of at least one input device, connected to at least one of an Internet, a virtual network, a social network, a world wide web, WAN, and/or LAN, wherein said anonymous communication contains information;
    encrypting the information, in part or in whole;
    submitting the encrypted information and any other information to be sent to at least one receiver of a plurality of receivers;
    generating at least one unique identifier and sending the at least one unique identifier and at least one confirmation message to the at least one submitter,
    and sending the at least one unique identifier and any non-encrypted information to the at least one receiver of a plurality of receivers, wherein the instructions further comprise a step, when the submitter chooses to only be identified as being anonymous, the submitter completing the anonymous e-mail address and/or text number entry field in the confirmation message;
    sending the confirmation message to the at least one receiver of the plurality receivers, wherein the submitter communication is identified as being anonymous;
    sending, by the at least one receiver of the plurality of receivers at least one response message anonymously back to the submitter in response to the at least one unique identifier, wherein the at least one receiver of the plurality of receivers is a targeted receiver for the communication;
    storing the non-encrypted information in at least one database;
    matching the targeted receiver to a specific communication and information targeted by the submitter associated to at least one unique identifier stored in the database;

providing a Receiver Unique Identifier to a host system administration device, system administration device and to each receiver;

granting the targeted receiver access to secure communication and information targeted by the submitter for the targeted receiver once the inputted Receiver Unique Identifier is verified;

wherein the targeted receiver is permitted to open communication(s), read the communication(s), act on the communication(s), forward the communication(s), respond to the communication(s), reply to the communication(s), and/or delete the communication(s) based on the inputted Receiver Unique Identifier.

16. The non-transitory storage device of claim 15, wherein the instructions further comprise a step, when the submitter chooses to be identified as being non-anonymous, wherein the submitter may reveal information such as their name, e-mail address, phone number, phone text number or network identity code or location for non-anonymous communications to the at least one receiver(s) and the information is stored in at least one data base, and the submitter communication is identified as being non-anonymous.

17. The non-transitory storage device of claim 15, wherein the instructions further comprise a step, wherein at least one of the at least one receiver(s) is a targeted receiver(s) of the communication, and further comprising the steps of: matching at least one targeted receiver to specific communications and information stored in a database and associated with at least one unique identifier; providing a Receiver Unique Identifier to a host system administration device, system administration device, and to each receiver; giving a receiver access to secure communications and information targeted by submitter to them once they input their Receiver Unique Identifier; and permitting the receiver to open communication(s), read the communication(s), act on the communication(s), forward the communication(s), respond to the communication(s), reply to the communication(s), and/or delete the communication(s).

* * * * *